(12) United States Patent
Papadopoulos

(10) Patent No.: US 9,800,284 B2
(45) Date of Patent: Oct. 24, 2017

(54) METHOD AND APPARATUS FOR RELATIVE TRANSCEIVER CALIBRATION FOR WIRELESS COMMUNICATION SYSTEMS

(71) Applicant: NTT DOCOMO, Inc., Tokyo (JP)

(72) Inventor: Haralabos Papadopoulos, Los Altos, CA (US)

(73) Assignee: DOCOMO, INC., Tokyo (JP)

(*) Notice: Subject to any disclaimer, the term of this patent is extended or adjusted under 35 U.S.C. 154(b) by 0 days.

(21) Appl. No.: 14/896,864

(22) PCT Filed: Jun. 16, 2014

(86) PCT No.: PCT/US2014/042586
§ 371 (c)(1),
(2) Date: Dec. 8, 2015

(87) PCT Pub. No.: WO2014/204868
PCT Pub. Date: Dec. 24, 2014

(65) Prior Publication Data
US 2016/0142094 A1 May 19, 2016

Related U.S. Application Data

(60) Provisional application No. 61/837,482, filed on Jun. 20, 2013.

(51) Int. Cl.
*H04B 1/38* (2015.01)
*H04L 5/16* (2006.01)
(Continued)

(52) U.S. Cl.
CPC ............ *H04B 1/40* (2013.01); *H04B 7/0413* (2013.01); *H04B 17/14* (2015.01); *H04B 17/21* (2015.01); *H04B 7/04* (2013.01)

(58) Field of Classification Search
CPC ........ H04B 1/40; H04B 7/0413; H04B 17/14; H04B 17/21; H04B 7/04
See application file for complete search history.

(56) References Cited

U.S. PATENT DOCUMENTS 7,392,015 B1 * 6/2008 Farlow ................... H04B 17/21
342/387
8,064,502 B2 * 11/2011 Sawai ............... H04L 25/03006
375/219
(Continued)

FOREIGN PATENT DOCUMENTS

WO 2014/039098 3/2014

OTHER PUBLICATIONS

Shepard, Clayton, et al., "Argos: Practical Many-Antenna Base Stations", Mobicom 2012, Istanbul, Turkey, Aug. 22-26, 2012, pp. 53-64.
(Continued)

*Primary Examiner* — Daniel Washburn
*Assistant Examiner* — Amneet Singh
(74) *Attorney, Agent, or Firm* — Blakely, Sokoloff, Taylor & Zafman LLP

(57) ABSTRACT

A method and apparatus is disclosed herein for relative calibration of transceivers in a wireless communication system. In one embodiment, the method comprises transmitting multiple pilots from units in the first group; receiving, in response to the multiple pilots, a first set of pilot observations at each unit in the second group; transmitting a single pilot simultaneously from at least two units in the second group; in response to the single pilot, receiving a second set of pilot observations at each unit in the first group; and using the first and second sets of pilot observa-
(Continued)

tions to calibrate each of at least two units in the second group based on a reference array of transceivers in the first group of transceivers.

30 Claims, 4 Drawing Sheets

(51) Int. Cl.
  *H04B 1/40* (2015.01)
  *H04B 17/14* (2015.01)
  *H04B 17/21* (2015.01)
  *H04B 7/0413* (2017.01)
  *H04B 7/04* (2017.01)

(56) References Cited

U.S. PATENT DOCUMENTS

| | | | |
|---|---|---|---|
| 2002/0193147 A1* | 12/2002 | Li | H01Q 1/246 455/562.1 |
| 2006/0018389 A1* | 1/2006 | Koorapaty | H04B 7/0626 375/259 |
| 2006/0128436 A1* | 6/2006 | Doi | H01Q 3/2605 455/562.1 |
| 2009/0046003 A1* | 2/2009 | Tung | H04B 7/0413 342/174 |
| 2010/0248635 A1* | 9/2010 | Zhang | H04B 7/0413 455/63.1 |
| 2012/0064838 A1* | 3/2012 | Miao | H01Q 3/267 455/73 |
| 2012/0252366 A1* | 10/2012 | Aoki | H04B 17/12 455/63.1 |
| 2012/0314563 A1* | 12/2012 | Luo | H04B 17/21 370/216 |
| 2013/0089123 A1* | 4/2013 | Rahul | H04L 27/2691 375/219 |
| 2014/0242914 A1* | 8/2014 | Monroe | H04B 17/11 455/63.4 |
| 2015/0222336 A1* | 8/2015 | Yilmaz | H04B 7/024 370/252 |
| 2016/0285534 A1* | 9/2016 | Li | H04B 7/0626 |

OTHER PUBLICATIONS

International Search Report dated Sep. 15, 2014 for International Application No. PCT/US2014/042586, filed Jun. 16, 2014, 4 pages.
Written Opinion of the International Searching Authority dated Sep. 15, 2014 for International Application No. PCT/US2014/042586, filed Jun. 16, 2014, 9 pages.

* cited by examiner

```
┌─────────────────────────────────────────────────────────────────────┐
│ During a first stage, cause the broadcasting of a first set of pilots from the first group │
│ of transceiver units one at a time over L slots, where the first group of transceiver │
│     units containing L transceiver units, where L is an integer 2 or greater     │
│                                    401                                    │
└─────────────────────────────────────────────────────────────────────┘
                                     │
┌─────────────────────────────────────────────────────────────────────┐
│  In response to the first set of pilots, during the first stage, cause a first set of pilot │
│ observations at the first and second groups of transceiver units to be received, where │
│  each transceiver unit in the second group of transceiver units collects L observations │
│                       in response to the first of pilots                       │
│                                    402                                    │
└─────────────────────────────────────────────────────────────────────┘
                                     │
┌─────────────────────────────────────────────────────────────────────┐
│   Thereafter, during the first stage, calibrate an L element reference array comprising │
│    the L transceiver units of the first group of transceiver units, by relatively calibrating │
│         the L elements relatively with respect to each other based on at least L pilot │
│      observations of the first set of pilot observations, with the L pilot observations being │
│            observations collected by elements in the L element reference array from pilots │
│                    transmitted by elements in the L element reference array                │
│                                    403                                    │
└─────────────────────────────────────────────────────────────────────┘
                                     │
┌─────────────────────────────────────────────────────────────────────┐
│  Next, during a second stage, cause the broadcasting simultaneously of a second set of │
│    pilots from K transceiver units of the second group of transceiver units, wherein each │
│       of the K transceiver units broadcast a single pilot per slot over one or more slots │
│                                    404                                    │
└─────────────────────────────────────────────────────────────────────┘
                                     │
┌─────────────────────────────────────────────────────────────────────┐
│       Also, during the second stage, receive a second set of pilot observations at the first │
│              group of transceivers in response to the second set of pilots              │
│                                    405                                    │
└─────────────────────────────────────────────────────────────────────┘
                                     │
┌─────────────────────────────────────────────────────────────────────┐
│          Based on the first and second sets of pilot observations, during the second stage, │
│  processing logic calibrates K transceiver units with respect to the L element reference │
│                                   array                                   │
│                                    406                                    │
└─────────────────────────────────────────────────────────────────────┘
```

Figure 4

METHOD AND APPARATUS FOR RELATIVE TRANSCEIVER CALIBRATION FOR WIRELESS COMMUNICATION SYSTEMS

PRIORITY

The present patent application is a U.S. National Phase Application under 35 U.S.C. §371 of International Application No. PCT/US2014/042586, filed Jun. 16, 2014, entitled METHOD AND APPARATUS FOR RELATIVE TRANSCEIVER CALIBRATION FOR WIRELESS COMMUNICATION SYSTEMS, which claims priority to and incorporates by reference the corresponding provisional patent application Ser. No. 61/837,482, titled, "Method for Fast Relative Transceiver Calibration for Large-Scale and Massive MIMO" filed on Jun. 20, 2013.

FIELD OF THE INVENTION

Embodiments of the present invention relate to the field of transceivers calibration in wireless communication systems; more particularly, the present invention relate to calibrating transceivers in a wireless system using a reference array of antenna elements.

BACKGROUND OF THE INVENTION

Conventional downlink MU-MIMO schemes have been at the forefront of investigations in the past decade. These schemes promise spectral efficiency increases by using multiple antennas at the base-station and serving multiple users simultaneously without the need for multiple antennas at the user terminals. This is achieved by using knowledge of the channel state information (CSI) between each user and the transmitting base-station. Having CSIT (CSI available at the transmitter) allows the transmitter to precode the user-terminal streams so that each user terminal sees only its own stream. Given a base station with M transmit antennas, K single-antenna user terminals can be served simultaneously, giving roughly a multiplexing gain equal to min(M,K) with respect to a system serving a single terminal.

For the transmitter to achieve this operation reliably it needs to have sufficiently accurate CSIT, i.e., the transmitter needs to know the channels between itself and each of the users with a sufficient amount of accuracy. The techniques used for acquiring CSIT fall into two classes. The first class employs M pilots (one per base-station transmit antenna) in the downlink, to allow each user terminal to estimate the channel coefficients between the user-terminal's own antenna(s) and those of the base-station. This operation provides each CSI at each receiving user-terminal (CSIR) regarding the channel between each base-station transmit antenna and the user-terminal receive antennas. The CSIR, i.e., the CSI information available at each user-terminal, is then fed back to the transmitter using uplink transmissions to provide CSIT, i.e., CSI at the transmitting base-station. This class of CSIT acquisition schemes have two overheads: (i) a downlink pilot overhead, which scales linearly with M (the number of antenna elements at the transmitting base-station); (b) an uplink feedback overhead, responsible for making available to the base-station the channels between each user-terminal and each base-station antenna. In the case where each user terminal has a single antenna, the uplink feedback is responsible for providing to the base-station the MK channel coefficients (complex-scalar numbers), one coefficient for each channel between each user terminal antenna and each base-station antenna. Although the uplink overhead could in principle be made to grow linearly with min(K,M), with the methods used in practice this overhead grows as the product of M and K. The downlink overhead limits the size of the antenna array, M, that can be deployed. Similarly, the uplink overheads limit both M and K, as the overheads grow very fast with respect to increasing M and K.

The second class of CSIT acquisition techniques is referred to as reciprocity-based training schemes. They exploit a property of the physical wireless channel, known as channel reciprocity, to enable, under certain suitably chosen (M,K) pairs, very high-rate transmission with very efficient CSIT training. In particular, pilots are transmitted in the uplink by each user (K pilots are needed, but more could be used) and the corresponding pilot observations at the base-station are directly used to form the precoder for downlink transmission. If the uplink training and the following downlink data transmission occur close enough in time and frequency (within the coherence time and the coherence bandwidth of the channel), then the uplink training provides directly the required (downlink channel) CSI at the transmitter, since the uplink and the downlink channels at the same time and frequency are the same. In this class of techniques, the uplink overhead scale linearly with K, i.e., with the number of user terminals that will be served simultaneously. These schemes are also typically envisioned as relying on TDD (Time Division Duplex) in order to allow uplink training and downlink transmission within the coherence bandwidth of the user terminal channel with a single transceiver shared for uplink and downlink data transmission.

One attractive aspect of reciprocity-based training schemes is that one can keep on increasing the size of the transmit antenna array, M, making it "massive", without incurring any increase in the training overhead. With M>K, increasing M does not increase the number of simultaneously multiplexed streams, K (i.e., K streams are simultaneously transmitted, one to each user), and increasing M induces significant beamforming gains on each stream (which translate to higher rate per stream), at no additional cost in training. Alternatively, increasing M allows reducing the transmit power required to yield a target rate to a user terminal, thereby allowing for greener transmission schemes.

The challenge with reciprocity based training schemes is that the "compound" uplink and downlink channels at the same time and frequency are not the same. Specifically, although the uplink and downlink physical channel components are the same, each compound channel between a "source node" (responsible for transmitting an information-bearing signal from the transmit antenna) and a destination node (attached to the receive antenna) includes additional impairments due to the transmitter (the circuitry, at the transmitter) and the receiver (the circuitry, at the transmitter). When the transmitter and receiver roles are interchanged, different impairments occur at each node, thereby rendering the two compound channels non-reciprocal.

However, these transmitter/receiver impairments vary or drift slowly with time (from one or a few seconds, when the antennas are driven by different oscillator clocks, to several minutes or longer when the antennas are driven by the same oscillator). As a result, this gives rise to a need for transceiver calibration, as a method to compensate for these transmitter/receiver impairments and bring reciprocity-based MU-MIMO to fruition.

Reciprocity-Based Massive MU-MIMO

Consider the problem of enabling MU-MIMO transmission from an array of M transmit antennas to K single-antenna user terminals. The downlink (DL) channel between the i-th base-station transmitting antenna and the j-th user terminal is given by $$\vec{y}_{ji} = \vec{r}_j \vec{h}_{ji} \vec{t}_i \vec{x}_i + \vec{z}_{ji}$$

where $\vec{x}_i$, $\vec{h}_{ji}$, $\vec{y}_{ji}$, $\vec{z}_i$, denote the transmitted signal from base-station antenna i, the DL channel between the two antennas, the observation and noise at the receiver of user terminal j, respectively. The scalar (complex) coefficient $\vec{r}_j$ contains the amplitude and phase shifts introduced by RF-to-baseband conversion hardware (e.g., gain control, filters, mixers, A/D, etc.) at the receiver of user terminal j. Similarly, the scalar (complex) coefficient $\vec{t}_i$ contains the amplitude and phase shifts introduced by the baseband-to-RF conversion hardware (e.g., amplifiers filters, mixers, A/D, etc.) at the transmitter generating the signal to be transmitted by base-station antenna i.

Similarly, the uplink channel between the j-th user terminal and the i-th base-station antenna is given by $$\vec{y}_{ij} = \vec{r}_i \vec{h}_{ij} \vec{t}_j \vec{x}_j + \vec{z}_{ij}$$

where $\vec{x}_j$, $\vec{h}_{ij}$, $\vec{y}_{ij}$, $\vec{z}_{ij}$ denote the transmitted signal from user terminal j, the uplink (UL) channel between the two antennas, the observation and noise at the receiver of base-station antenna i, respectively. The scalar (complex) coefficient $\vec{r}_i$ contains the amplitude and phase shifts introduced by RF-to-baseband conversion hardware (e.g., gain control, filters, mixers, A/D, etc.) at the receiver of base-station antenna i. Similarly, the scalar (complex) coefficient $\vec{t}_j$ contains the amplitude and phase shifts introduced by the baseband-to-RF conversion hardware (e.g., amplifiers filters, mixers, A/D, etc.) at the transmitter generating the signal to be transmitted by user terminal j.

In the uplink, the following model may be used:

$$\tilde{y} = \bar{R}\,\bar{H}\,\bar{T}\,\tilde{x} + \tilde{z}$$

where $\tilde{x}$ is the vector of dimension K×1 (i.e., K rows by 1 column) comprising the user symbols on subcarrier n at symbol time t, $\bar{H}$ is the M×K channel matrix that includes the constant carrier phase shifts and the frequency-dependent constant in time phase shifts due to the relative delays between the timing references of the different terminals, $\tilde{y}$ and $\tilde{z}$ are the received signal vector and noise at the user terminals, $\vec{R} = \mathrm{diag}(\vec{r}_1, \vec{r}_2, \ldots \vec{r}_M)$ and $\vec{T} = \mathrm{diag}(\vec{t}_1, \vec{t}_2, \ldots \vec{t}_K)$.

In the downlink, the following model may be used:

$$\vec{y} = \vec{x}\vec{R}\vec{H}\vec{T} + \vec{z}$$

where $\vec{x}$ is the (row) vector of user symbols on subcarrier n at symbol time t, $\vec{H}$ is the K×M channel matrix that includes the constant carrier phase shifts and the frequency-dependent constant in time phase shifts due to the relative delays between the timing references of the different terminals, $\vec{y}$ and $\vec{z}$ are the received signal (row) vector and noise at the user terminals, $$\vec{R} = \mathrm{diag}(\vec{r}_1, \vec{r}_2, \ldots \vec{r}_K) \text{ and } T = \mathrm{diag}(\vec{t}_1, \vec{t}_2, \ldots \vec{t}_M).$$

The matrices $\bar{R}$, $\bar{T}$, $\vec{R}$ and $\vec{T}$ are unknown locally constant diagonal matrices. For purposes herein the term "locally constant" means that they might vary over very long time (certainly, much longer than the coherence time of the channel), mainly due to thermal drift effects, but they do not depend on any "fast effects" such as frequency offsets and propagation time-varying fading, since these effects are all already taken care of by the timing and carrier phase synchronization, and included in the matrices $\vec{H}$ and $\bar{H}$. By reciprocity of the physical channel, the following equality exists $$\bar{H} = \vec{H}$$

For simplicity, the thermal noise is neglected. In order to estimate the downlink channel matrix, the K user terminals send a block of K OFDM symbols, such that the uplink-training phase can be written as $$\overline{Y_{tr}} = \overline{R H T X_{tr}} + \text{noise}$$

where $\overline{X_{tr}}$ is a scaled unitary matrix. Hence, the base-station can obtain the channel matrix estimate $$\overline{Y_{tr} X_{tr}} = \overline{R H T} + \text{noise}$$

However, in order to perform downlink beamforming the downlink matrix $\vec{T}\vec{H}\vec{R}$ is needed. While reciprocity ensures that the physical channel component in the uplink estimated channel yields immediately the corresponding component in the downlink channel (it is assumed that uplink training and downlink data transmission occur in the same channel coherence time), the transmit and receive diagonal matrices for the downlink need to be known, while the product of those matrices for the uplink and the channel matrix $\bar{H} = \vec{H}$ are here, which are generally arbitrarily related.

Prior Art on Relative Calibration: The Argos Scheme

In C. Shepard et al., "Argos: Practical Many-Antenna Base Stations," in Mobicom 2012, Istanbul, Aug. 22-26, 2012 (hereinafter referred to as Argos), the Argos relative calibration method is described. As a prelude to describing the Argos relative calibration method, notice that the downlink channel matrix $\vec{T}\vec{H}\vec{R}$ is not entirely needed to perform beamforming. In fact, only the column-space of this matrix is needed, that is, any matrix formed by $\vec{T}\vec{H}A$, where A is some arbitrary invertible constant diagonal matrix, is good enough for any kind of beamforming. For example, consider Zero Forced Beamforming (ZFBF). The ZFBF precoding matrix can be calculated as $$W = \Lambda^{1/2} [A^H \vec{H}^H \vec{T}^H \vec{T}\vec{H}A]^{-1} A^H \vec{H}^H \vec{T}^H$$

where $\Lambda$ is a diagonal matrix that imposes on each row of the matrix W, the row normalization $\|wm\|^2 = 1$, for all m. Hence, the ZFBF precoded signal in the downlink will be $$\tilde{y} = \vec{u} W \vec{T}\vec{H}\vec{R} + \tilde{z}$$
$$= \vec{u}\,\Lambda^{1/2} [A^H \vec{H}^H \vec{T}^H \vec{T}\vec{H}A]^{-1} A^H \vec{H}^H \vec{T}^H \vec{T}\vec{H}\vec{R} + \tilde{z}$$
$$= \vec{u}\,\Lambda^{1/2} A^{-1} \vec{R} + \tilde{z}$$

Notice that the resulting channel matrix is diagonal, provided that K≤M. It follows that the problem is how to estimate $\vec{T}\vec{H}$ up to the left multiplication by some known matrix A, from the uplink training observation $\bar{R}\,\bar{H}\,\bar{T}$, knowing that $\bar{H} = \vec{H}$. Following the relative calibration procedure of Argos, the fact that the diagonal matrices $\bar{R}$, $\bar{T}$, $\vec{R}$, and $\vec{T}$ are essentially constant in time for intervals much longer than the slot duration is exploited (the calibration procedure may be repeated periodically, every some tens of seconds or even more, depending on the hardware stability, temperature changes, etc.).

The procedure, amounting to the Argos calibration method, consists of the following steps:

1) Training from a calibration-reference base-station antenna, e.g., antenna 1: send a pilot symbol from base-station antenna 1 to all other base-station antennas, i.e., to the set of base-station antennas S={2, 3, ..., M}. The received signal at the BS antennas, S, is given by $$y_{s \rightarrow 1} = \overline{R}_s h_{s \leftarrow 1} \vec{t}_1 + \tilde{z}_{s \rightarrow 1}$$

where $\vec{t}_1$ is the coefficient due to base-station reference antenna (i.e., antenna 1) transmit RF chain, $\overline{R} = \text{diag}(\overline{r}_2, \overline{r}_3, ..., \overline{r}_m)$, i.e., it is a diagonal matrix containing the coefficients due to the other base-station antennas receive RF chains, the (M−1)×1 vector $h_{s \leftarrow 1}$ denotes physical channel from reference base-station antenna 1 to the rest of the base-station antennas, and the (M−1)×1 vector $\tilde{z}_{s \leftarrow 1}$ represents thermal noise at the (M−1) non-transmitting base-station antennas.

2) Training from the base-station antennas in the set S to the calibration-reference antenna 1: the base-station antennas 2, 3, ..., M, respond with a sequence of M−1 symbols each, to form a (proportional to) unitary training matrix (one special case corresponds to sending one pilot each at a time). The signal received by the calibration-reference antenna is given by $$y_{s \rightarrow 1} = \vec{X}_{calib} \vec{T}_s h_{s \rightarrow 1} \overleftarrow{r}_1 + \tilde{z}_{s \rightarrow 1}$$

where $\overleftarrow{r}_1$ is the coefficient due to the calibration-reference antenna receive RF chain.

3) Calibration process: pre-multiplying $\vec{X}_{calib}^H$, the BS obtains $$\vec{X}_{calib} y_{s \rightarrow 1} = \vec{T}_s h_{s \rightarrow 1} \overleftarrow{r}_1 + \text{noise}$$

Now, notice that, due to physical channel reciprocity, $h_{s \rightarrow 1} = h_{s \leftarrow 1}$. Hence, for each m=2, 3, ..., M, the base station can compute the ratios $$\frac{[\vec{X}_{calib}^H y_{s \rightarrow 1}]_{m-1}}{[y_{s \rightarrow 1}]_{m-1}} = \frac{\vec{t}_m [h_{s \rightarrow 1}]_{m-1} \overleftarrow{r}_1 + \text{noise}}{\overline{r}_m [h_{s \rightarrow 1}]_{m-1} \vec{t}_1 + \text{noise}}$$

$$= \frac{\vec{t}_m}{\overline{r}_m} \frac{\overleftarrow{r}_1}{\vec{t}_1}$$

$$= \text{noise}$$

At the end of the calibration process, for sufficiently high SNR such that the noise can be neglected, one has obtained the diagonal calibration matrix $\vec{T} \overline{R}_{a_1}^{-1}$, where $a_1 = \overleftarrow{r}_1 / \vec{t}_1$ is an irrelevant constant term that depends only on the calibration-reference antenna up and down modulation chains. At this point, the desired downlink channel matrix can be obtained from the calibration matrix $\vec{T} \overline{R}_{a_1}^{-1}$ and the uplink estimated channel matrix $\overline{R} \tilde{H} \vec{T}$ simply by multiplication with the uplink estimated channels. In particular, it follows that, $$\vec{T} \overline{R}^{-1} a_1$$

$$a_1 \vec{T} \overline{R}^{-1} Y_{tr} \overleftarrow{X}_{tr}^H = a_1 \vec{T} \overline{R}^{-1} \overline{R} H \vec{T} + \text{noise}$$
$$= \vec{T} H [a_1 \vec{T}] + \text{noise}$$
$$= \vec{T} H A + \text{noise}$$

where $A = a_1 \vec{T}$.

The self-calibration process of Argos takes at least M OFDM symbols, one symbol for the pilot from reference antenna to all other base-station antennas, and M−1 OFDM symbols to send orthogonal training sequences from all the other base-station antennas to the calibration-reference antenna.

The Argos calibration method has its limitations. First note that the relative calibration of each base-station antenna (with respect to the reference antenna) is formed as the ratio of two observations, and, in particular, by dividing [$\vec{X}_{calib}^H y_{s \rightarrow 1}]_{m-1}$ with $[y_{s \rightarrow 1}]_{m-1}$. The noise in the dividing term $[y_{s \rightarrow 1}]_{m-1}$ can cause a large estimation error in the calibration estimate. This effect was indeed noticed by the developers of Argos when they stated: "Another challenge we encountered while performing our indirect calibration approach is the significant amplitude variation for the channels between the reference antenna 1 and other antennas. This is due to the grid-like configuration of our antenna array where different pairs of antennas can have very different antenna spacings. According to our measurement, the SNR difference can be as high as 40 dB, leading to a dilemma for us to properly choose the transmission power for the reference signal." Their solution was to carefully place the reference antenna with respect to the rest of the base-station antennas, namely: "we isolate the reference antenna from the others, and place it in a position so that its horizontal distance with respect to the other antennas is approximately identical. Such placement of the reference antenna does not affect the calibration performance due to our calibration procedure's isolation of the radio hardware channel from the physical channel."

Such a need for careful placement of the reference antenna with respect to the rest of the transmitting antennas is a significant limiting factor in deployments relying on the Argos calibration methods. This strict requirement limits the scope of the Argos calibration methods, as it significantly limits their efficacy in downlink MU-MIMO deployments from sets of non-collocated antennas.

In general, for noise robustness purposes, much larger blocks and maximal ratio combining of the received power can be used, such that D pilot symbols can be sent from reference antenna 1 to the other base-station antennas, and M−1 orthogonal training sequences can be sent over (M−1)D symbols from the other base-station antennas to the reference antenna 1, achieving a factor D in signal to noise ratio for calibration, where D≥1 is some sufficiently large integer in order to improve performance. However, this does not eliminate the inherent limitations of the Argos calibration methods especially for scalable and distributive deployments.

In O. Bursalioglu et al., "Method and Apparatus for Internal Relative Transceiver Calibration for Reciprocity-based MU-MIMO Deployments," PCT Application No. PCT/US2013/032299, filed Mar. 15, 2013 (hereafter referred to as Bursalioglu), a new class of methods and apparatuses are disclosed, which allow distributed and readily scalable relative calibration. These relative calibration methods can be used for providing calibration that robustly enables high-performance reciprocity-based downlink MU-MIMO schemes from collocated as well non-collocated antenna arrays.

Extensions of the Argos approach have been considered involving the same topology and the same number of calibration training slots, i.e. D slots per base-station antenna (with D≥1). The extension is as follows: Each antenna, including the calibration antenna 1, first broadcasts independently its training symbols. This requires the same signaling dimensions as Argos, but also requires the matrix $\bar{X}_{calib}$ to be diagonal, i.e., when each of the antennas in the set S transmits the remaining set of antennas in S are not transmitting and thereby they can receive. After each antenna has broadcasted its training symbol(s), all the measurements are collected of the form $$y_{ij} = \vec{r}_i{}_j h_{ij} \vec{t}_j w_{ij}$$

corresponding to the training symbol from antenna j to antenna i, for each i≠j, 0≤i,j≤M. This is in contrast to Argos which relies only on the set of observations $y_{i1}$ and $y_{1i}$, for all i. In the preceding equation, $w_{ij}$ is an i.i.d. complex Gaussian noise sample, with appropriate variance (including the effect of the training length D, which may be a design parameter to trade-off efficiency for noise margin, as explained before). Assuming perfect physical channel reciprocity, i.e., $k_{ij}=h_{ji}$ and grouping the above measurements in pairs, $$\begin{bmatrix} y_{ij} \\ y_{ji} \end{bmatrix} = \begin{bmatrix} \vec{r}_i \vec{t}_j \\ \vec{r}_j \vec{t}_i \end{bmatrix} h_{ij} + \begin{bmatrix} w_{ij} \\ w_{ji} \end{bmatrix} \quad (1)$$

$$= \begin{bmatrix} c_i \\ c_j \end{bmatrix} \beta_{ij} + \begin{bmatrix} w_{ij} \\ w_{ji} \end{bmatrix}$$

Where $\beta_{ij}=\vec{t}_i\vec{t}_j h_{ij}$ are complex coefficients associated to the unordered pair of antennas i,j.

Since, in the absence of noise, $y_{ij}c_j=y_{ji}c_i=c_ic_j\beta_{ij}$, a natural cost function can be formed $$J(c_1, c_2, \ldots, c_M) = \sum_{\substack{j>1 \\ (i,j)\in F}} |y_{ij}c_j - y_{ji}c_i|^2 \quad (2)$$

and the relative calibration coefficients can be selected so as to minimize this metric. The set F defines the set of (i,j) pairs of ordered measurements ($y_{ij}$, $y_{ij}$) used for determining the calibration coefficients. In order to avoid the trivial all-zero solution, we can impose, without loss of generality, that |c1|=1.

In one approach the calibration coefficients are found as the solution of the optimization problem:

$$\text{minimize } J(c_1, c_2, \ldots, c_M) = \sum_{\substack{j>1 \\ (i,j)\in F}} |y_{ij}c_j - y_{ji}c_i|^2$$

$$\text{subject to } \sum_{k=1}^{M} |c_k|^2 = 1$$

Prior art calibration methods enable coherent MU-MIMO transmission from small, large, or Massive MIMO arrays, with collocated or non-collocated antenna elements. Special examples of the non-collocated case involve network MIMO in cellular, transmission from remote radio heads (RRH), but also more general MU-MIMO schemes, whereby user terminals are simultaneously served by different (overlapping) sets of antennas in a field of antenna elements. In addition, a combination of reference-signaling methods for calibration and new techniques for performing calibration exist in the prior art, which enable resource-efficient and reliable and robust calibration for network Massive MIMO, MU-MIMO based on remote radio heads, hierarchical calibration, as well as on demand, distributed calibration for reciprocity based MU-MIMO based on set of possibly overlapping arrays of non-collocated antenna elements.

SUMMARY OF THE INVENTION

A method and apparatus is disclosed herein for relative calibration of transceivers in a wireless communication system. In one embodiment, the method comprises transmitting multiple pilots from units in the first group; receiving, in response to the multiple pilots, a first set of pilot observations at each unit in the second group; transmitting a single pilot simultaneously from at least two units in the second group; in response to the single pilot, receiving a second set of pilot observations at each unit in the first group; and using the first and second sets of pilot observations to calibrate each of at least two units in the second group based on a reference array of transceivers in the first group of transceivers.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 is a flow diagram of one embodiment of a process for performing relative calibration of transceiver units in a first entity.

DETAILED DESCRIPTION OF THE PRESENT INVENTION

Figure 1:
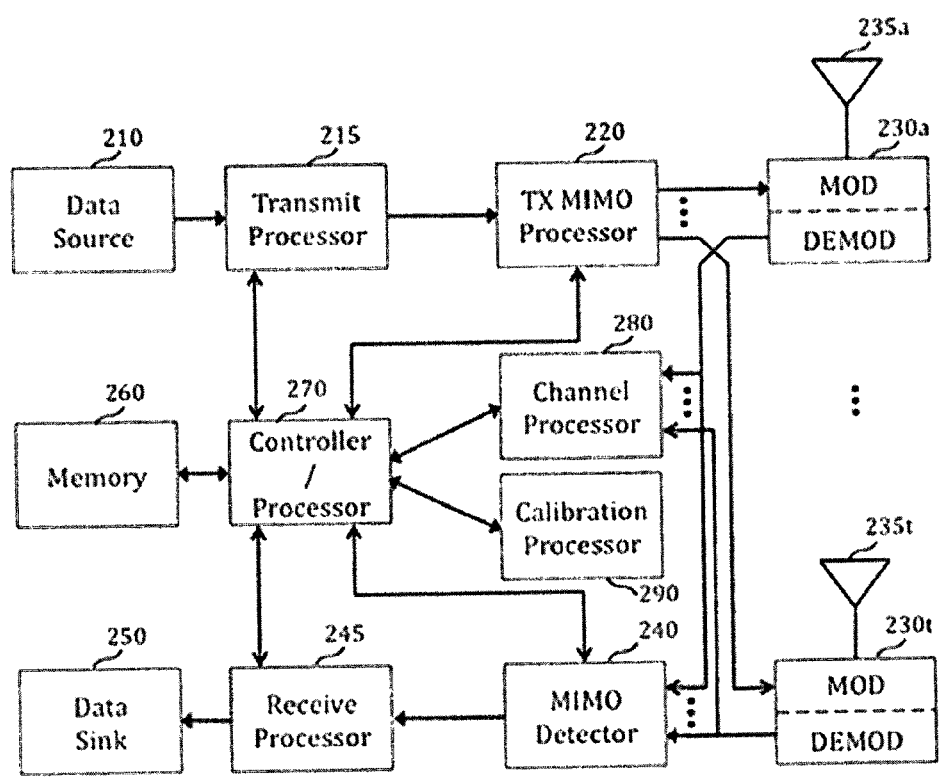
FIG. 1 illustrates a base station with a calibration processor unit.

Embodiments of the invention include a class of very high efficiency, readily scalable methods for relative transceiver calibration. These relative calibration methods can be used to provide the calibration quality necessary for enabling high-performance reciprocity-based downlink MU-MIMO schemes, and can do so with much lower calibration training overheads than certain state-of-the-art alternatives. The proposed calibration methods can thus enable reliable joint calibration of Massive MIMO in small cells, with collocated or non-collocated antenna elements and with manageable overheads.

Embodiments of the invention include a combination of new reference-signaling methods for calibration and new techniques for performing calibration, enabling resource-efficient and reliable and robust calibration. They can also be combined with prior art techniques to enable robust and reliable calibration (with significantly lower overheads than certain prior art techniques) for network Massive MIMO, MU-MIMO based on remote radio heads, and hierarchical calibration.

Embodiments of the invention allow fast (i.e., low-overhead) and robust calibration for reciprocity-based MU-MIMO formed across collocated or non-collocated antenna elements. To our knowledge at this time, no other methods have the training efficiency provided by the methods disclosed herein.

The techniques described herein enable reciprocity-based MU-MIMO over TDD deployments, such as e.g., in the 3.5 GHz and above. It is envisioned that massive MIMO will be realized in bands in 10 GHz range, or higher. As large numbers of antennas (hundreds or more) can be packed in a small space at these frequencies, calibration methods that allow jointly calibrating large numbers of antennas with manageable overheads become very attractive.

All signaling protocols in Argos and Bursalioglu locally rely on the basic signaling efficiency of Argos, whereby an array of M elements can be calibrated, provided (at least) M independent time-frequency resource elements are used for pilot transmissions (and at least two of these transmissions happen at different times). The pilot protocols and calibration schemes described herein allow calibration of large arrays with much lower signaling overheads than Argos and Bursalioglu. In particular, assuming calibration over OFDM transmission, and given a block of N tones by T OFDM symbols (over time), the inventive signaling and calibration schemes described herein allow calibration of arrays as large as $2N+N^2[(T-1)T-1]$, as opposed to just NT. Assuming calibration training is over an N by T block of time-frequency slots, with N=12, and T=7, half a resource block (RB) in LTE, the protocols in Argos and Bursalioglu can calibrate an 84-element array, while the new inventive protocols described herein allow calibrate of arrays with as many as 2904 elements.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of this invention include calibration methods that enable calibrating large (collocated or non-collocated) antenna arrays with much higher efficiency (i.e., much lower overheads) than the calibration methods of Argos, and their significantly improved versions presented in Bursalioglu. In particular, subject to the same (given) calibration signaling overhead used in Argos or Bursalioglu, the techniques set forth herein enable jointly calibrating arrays of (possibly much) larger size than the schemes in Argos and Bursalioglu. Furthermore, embodiments of the invention enable reliable self-calibration methods for DL MU-MIMO deployments from non-collocated antennas. These DL MU-MIMO options include the use of network MIMO techniques over cellular deployments, MU-MIMO based on remote radio heads (RRH), as well as more general "MU-MIMO over a field of antennas" schemes, whereby multiple-users are served simultaneously by overlapping sets of non-collocated antennas. Furthermore, the methods set forth herein can be used in conjunction with the techniques in Bursalioglu to allow hierarchical calibration, sequential calibration, and scalable (and robust) calibration but with higher signaling efficiency than Bursalioglu.

FIG. 1 shows a block diagram of a design of a base-station 200 in accordance with embodiments of the invention. Base-station 200 includes standard modules for MIMO wireless transmission.

Referring to FIG. 1, in one embodiment, transmit processor 215 at base-station 200 receives data for one or more user equipments (UEs) from a data source 210, processes the data for each UE, and provides data symbols to all UEs. Processor 215 also receives and processes control information from a controller/processor 270 and provides control symbols. In one embodiment, processor 270 also generates reference symbols for one or more reference signals. In one embodiment, a transmit (TX) MIMO processor 220 performs precoding on the data symbols, the control symbols, and/or the reference symbols for each UE as well as for reference signals for antennas collocated at the same base-station 200 or to other wireless entities such as other base-stations, RRH's, etc.

In one embodiment, processor 220 may provides parallel output symbols streams to modulators, MODS 230a-230t. Each modulator 230 further processes (e.g., convert to analog, amplify, filter, and upconvert) the output sample stream to obtain a downlink signal in a manner well-known in the art. The downlink signals from modulators 230a-230t are transmitted via antennas 235a-235t, respectively.

At base-station 200, the uplink signals from various UEs or by other antennas, collocated at the same base station 200 or located at different base-stations or other wireless entities may be received by antennas 235a through 235t, demodulated by demodulators (DEMODs 230a-230t). The demodulated signals are detected by MIMO detector 240 and further processed by a receive processor 245 to obtain decoded data and control information sent by UEs and other wireless entities. Receive processor 245 receives detected signals from MIMO detector and provides decoded data to a data sink 250 and control information to the controller/processor 270. The demodulated signals output by DEMODs 230a-230t are also provided to the channel processor 280 where uplink channel are estimated and provided to the controller/processor 270.

The base-station design in FIG. 1 also includes a calibration-processing unit 290. This is responsible for estimating (and possibly compensating for) the impairments introduced by RF-to-baseband conversion hardware (e.g., gain control, filters, mixers, A/D, etc.) coupled with each of antenna elements 235a-235t when base-station 200 processes uplink received signals from these elements, as well as the impairments introduced by the baseband-to-RF conversion hardware (e.g., amplifiers filters, mixers, A/D, etc.) coupled with each antenna element 235a-235t when base-station 200 generates the signals that are to be transmitted by base-station antenna elements 235a-235t. In one embodiment, viewing the combination of element 230a with element 235a as a single (non-calibrated) transceiver unit, and viewing all such combinations of elements 230a-230t with their respective elements 235a-235t as individual transceiver units, calibration processor 290 performs processes for relative calibration of a subset of these transceiver units that are used to enable reciprocity based MU-MIMO from a subset of these transceiver units. In one embodiment, processor 290 exchanges control information with the controller/processor unit 270. The calibration processor 290 calculates calibration values via a combination of techniques well-known in the art such as, for example, Argos and Bursalioglu, and the new techniques disclosed herein, which may be used at controller/processor 270 together with UL channel estimation to construct one or more precoding vectors for one or more UEs in a manner well-known in the art (e.g., Bursalioglu) and provide them to TX MIMO Processor 220 for precoding. In some embodiments, processor 290 is provided additional information from other base stations, indicative of signals received and/or transmitted by other base stations, to assist in relative calibration of transceiver units connected to separate base stations.

Embodiments described above are enabled, at least in part, by processing unit 290, and involve both the signaling and data collection aspects of calibration as well as the relative calibration methods set forth herein, which are based on the collected data, and, possibly additional parameters, including past relative calibration values for arbitrary subsets of the transmit antenna nodes at this and possibly other base stations.

Multiplexing Gains in Relative Calibration

Novel families of relative calibration protocols are disclosed herein, which enable multiplexing gains in calibration signaling, and, more generally, allow trading off multiplexing gains in calibration signaling with (diversity in the) relative calibration quality. Throughout it is assumed that calibration occurs over blocks of T×N time-frequency (TF) slots. In one embodiment, T is assumed to be within the coherence time of these channels and also within the coherence time of the RF impairment quantities that need to be calibrated. Similarly, F is the coherence bandwidth of these channels, while the coherence bandwidth of the RF impairment quantities that need to be calibrated is N or higher. Using T, N, and F, families of protocols are described as a function of T, N, and F.

Consider the application of the signaling and calibration protocols over a T×N block of TF slots. Assuming for a moment F≥N (so all access point (AP)-to-AP channels remain constant with the T×N block of TF slots), with the signaling protocols considered in the preceding sections, a T×N block of time-frequency slots, during which "all" channels are constant, can be used to enable relative calibration of an array of TN antenna nodes, where each of the TN antenna nodes uses a distinct slot (out of the total TN slots) to broadcast a pilot. In addition, each antenna node collects observations during all other-pilot transmissions that occur in TF slots with different time index than the antenna's single pilot broadcast (i.e., a total of (T−1)N TF slots). The network can then be calibrated with the techniques of the preceding section for any T>1 and any N≥1. The same holds true for any F≥2.

Embodiments of the invention include methods for calibrating larger-size networks within a T×N block of time-frequency slots, for any T>2 and any TN>2. Effectively, although for the case (T=2, N=1) no more than 2 elements can be calibrated with respect to one another (as in the referenced scheme), for any other (N, T) combination with T>1, there exists protocols that can calibrate arrays with size strictly larger than the reference scheme.

First consider the case N=1 (involving a block of T TF slots over a single OFDM tone). In such a case, it is possible to calibrate a number of nodes that grows quadratically with T. Then the general (N, T) case is considered with F≥N and present protocols for which the number of calibrated nodes grows quadratically with both T and N, thereby a significant improvement with respect to the baseline schemes of Argos and Bursalioglu. Finally, the case F≤N is considered, and protocols are disclosed for which the number of calibrated nodes grows quadratically with T and linearly with the product FN.

Single-Tone Calibration: Signaling and Calibration Over T Time Slots

Embodiments of the calibration protocols set forth herein exploit two facts:

1) Assuming pilots are transmitted in TF slots for t in the set $\{1, 2, \ldots, T\}$, at any given time $t \geq 2$, (multi-element) parts of the array can be calibrated over a set of two or more slots.

2) Such a calibrated part of the antenna array based on pilots broadcasted during the set of time instances, together with observations at uncalibrated elements from the same pilots can be jointly exploited to "harvest multiplexing gains" in calibration, that is, to calibrate multiple nodes with respect to the (already) calibrated part of array with a single channel use (TF slot).

Multiplexing Gains in Relative Calibration with Pre-Calibrated Arrays

As a prelude to describing the disclosed new families of calibration protocols, first consider in detail item (b) above. Consider a single multi-element calibration instance, in which multiple elements are to be calibrated simultaneously with respect to a pre-calibrated "reference" array, with a single additional pilot transmission. The array with index $j=0$ has $M_0=M>1$ elements, while for $j>0$, it is assumed an array of $M_j \geq 1$ elements has been calibrated already, i.e. its elements are relatively calibrated with respect to each other (e.g., based on earlier calibration signaling)

$$R_j = A_j T_j c_j \text{ for } j \geq 0 \tag{3}$$

and where the $M_j \times M_j$ complex-valued diagonal (invertible) matrices $T_j$ and $R_j$ represent the (unknown) transmitter and receiver RF impairments, respectively, $c_j$ is an unknown (non-zero) complex scalar, and $A_j$ is a known diagonal (invertible) matrix, representing the effect of (prior) relative calibration of the elements of the j-th array.

Let $H_{0j}$ denote the $M_j \times M$ physical channel matrix from antenna array 0 to array j, comprising of independent identically-distributed (iid) complex-valued Gaussian zero-mean entries each with variance $\sigma h2(j)$, and where $\sigma h2(j) > 0$. The $M \times M_j$ channel matrix describing the reverse channel is denoted as $H_{j0}$, and it is assumed all signaling takes place within the coherence time and bandwidth of the channel. Hence, due to channel reciprocity, $H0_j = [H_j0]T$.

In addition, for $j \geq 1$, it is assumed that observations are available at the j-th array from pilots transmitted by the zero-th antenna array, each in the following form of an $M_j \times L$ matrix:

$$Y_j = R_j H_0 T_0 P + z_j \tag{4}$$

where P is a known $M \times L$ matrix with $L \leq M$ linearly independent columns (each column representing a pilot beam), the $\{Z_j\}$'s are independent noise matrices, and where $Z_j$ has i.i.d. Gaussian zero-mean entries with variance $\sigma z2(j)$.

In a single channel use, consider the single simultaneous single-pilot transmission from all K elements with j indices in the set $\{1, 2, \ldots, K\}$ of a given set of pilots, $\{v_j\}$, where $v_j$ is an arbitrary non-zero vector. In such a case, the zeroth array collects the following $M \times 1$ observation vector at the reference array of the form:

$$y_0 = R_0 \sum_{j=1}^{K} H_{0j} T_j v_j + z_0 \tag{5}$$

where $z_0$ is a noise vector with i.i.d. with zero-mean Gaussian entries with power $\sigma_z^2(0)$.

Then consider joint relative calibration of all arrays with j indices in the set $\{0, 1, 2, \ldots, K\}$ i.e., estimation of $c_j/c_0$ for $1 \leq j \leq K$, based on the observations of $y_0$ and $Y_j$ for $1 \leq j \leq K$ above, and while exploiting the set of relative calibration conditions for $0 \leq j \leq K$. Assume also that the reference array satisfies (4) with a known diagonal (invertible) matrix, representing the effect of relative calibration of the reference array. Then, relative calibration of the K antenna elements with respect to the reference array is possible, if and only if $K \leq L$. Specifically, letting $c_j = r_j/t_j$, in the absence of noise ($\sigma_z^2 \to 0$), it is possible to obtain $c_j/c_0$ with probability 1, if and only if $K \leq L$.

Next it is shown that such relative calibration is possible, i.e., it is possible to obtain $c_j/c_0$ in the absence of noise with probability 1, as long as $K \leq L$. In particular, consider the quantity $$[e_j^T(\tilde{Q}^H\tilde{Q})^{-1}\tilde{Q}^H P^T A_0^{-1} y_0]^1 \tag{6}$$

with $e_j$ denoting the j-th column of the $K \times K$ identity matrix, and $\tilde{Q}$ given by $$\tilde{Q} = [\tilde{q}_1 \tilde{q}_2 L \tilde{q}_K] \text{ with } \tilde{q}_j = Y_j^T A_j^{-1} v_j. \tag{7}$$

As is shown next, in the absence of noise, the quantity in Eqn. (6) above equals $c_j/c_0$ (with probability 1). Towards this end, the following quantity $$l_j = \frac{f_j^H Y_j^T d_j}{f_j^H P^T A_0^{-1} y_0} \tag{8}$$

and show that this quantity can be made equal to $c_j/c_0$ (in the absence of noise), for appropriate choices of $d_j$ and $f_j$. First, it is convenient to rewrite Eqn. (4) using Eqn. (3) as follows:

$$Y_j^T = c_j G_j^T A_j + Z_j^T \tag{9}$$

where $G_j$ is the following full-rank $M_j \times L$ matrix $$G_j = T_j H_{0j} T_0 P. \tag{10}$$

Also defined is $$Q = [q_1 q_2 L q_k] \text{ with } q_j = G_j^T v_j, \tag{11}$$

and note that Q has rank min(L,K). Left multiplication of both sides of Eqn. (5) by $P^T A_0^{-1}$ (which is a well-defined operation, since $A_0$ is invertible), and using Eqns. (3), (10) and (11), yields $$P^T A_0^{-1} y_0 = c_0 \sum_{k=1}^{K} G_j^T v_j + P^T A_0^{-1} z_0 = c_0 Q1 + P^T A_0^{-1} z_0 \tag{12}$$

Furthermore, substituting in the expression for $\tilde{q}_j$ in Eqn. (7) the expression for $Y_j^T$ in Eqn. (9) and using Eqn. (11) yields $$\tilde{q}_j = Y_j^T A_j^{-1} v_j = c_j q_j + Z_j^T A_j^{-1} v_j \tag{13}$$

Hence, for the choice $d_j = A_j^{-1} v_j$ the quantity $l_j$ in Eqn. (8) becomes in the absence of noise, $$l_j = \frac{c_j}{c_0} \frac{f_j^H q_j}{f_j^H Q1} \tag{14}$$

Next note that, selecting any non-zero vector $f_j$ with the property that it is orthogonal to all $q_k$ for $k \leq j$ yields the desired quantity $c_j/c_0$. Such a vector $f_j$ exists (with probability 1) as long as $K \leq L$. Although Q is not directly available, it is still possible to select $f_j$ with this zero-forcing property. Towards this end, given a $k_1 \times k_2$ full-rank matrix W with $k_1 \geq k_2$, $P_{inv\text{-}norm}(W)$ the pseudo-inverse of W is denoted as with unit-norm rows, i.e., $(W^H W)^{-1} W^H$, with its rows, however, rescaled to have unit norm. Letting $F=[f_1\ f_2\ L\ f_k]^H$, F is chosen as follows:

$$F = P_{inv-norm}(\tilde{Q}) \quad (15)$$

where $\tilde{Q}$ is given by Eqn. (7), and where the pseudoinverse exists provided K≤L. Due to Eqn. (13), in the absence of noise, we have $\tilde{q}_j = c_j q_j$, and therefore $P_{inv-norm}(\tilde{Q}) = P_{inv-norm}(Q)$. As a result, for the choice of F above, the quantity $l_j$ in Eqn. (14) equals $c_j/c_0$ with probability 1, as desired. It can also be readily shown, that for this choice of $d_j$ and $f_j$, the quantity $l_j$ in Eqn. (8) also equals the expression in Eqn. (6).

Note that different choices of K in the set of {1, 2, . . . . , L} trade off "multiplexing gain" in calibration (i.e., the number of antennas calibrated with a single pilot transmission) with a form of "diversity" in calibration. This diversity effect is evident in the form of a receive beamforming gain, when the setting described by the set of equations (3)-(5) is considered with K strictly less than L. In this case K<L uncalibrated antennas (one from each calibrated array) simultaneously transmit pilots. The pseudoinverse based filter $f_j$, used to calibrate the j-th array with respect to the zeroth array, satisfies by construction $$f_j^H \tilde{q}_k \text{ for all } k \neq j.$$

Therefore in calibrating the j-th array, K−1 out of the L available dimensions are used for zero-forcing from $y_0$ the response of all other pilots (besides the one from the j-th array). Hence, the receive beamforming filter $f_j$ is in the (L−K+1 dimensional) null space of the space spanned by the zeroth-array response to the remaining K−1 pilots (simultaneously transmitted by the other K−1 arrays calibrated simultaneously). It follows, that the pseudoinverse based filter, $f_j$, effectively performs receive-antenna beamforming in this subspace, harvesting a receive-beamforming gain of order L−K+1 (which is greater than 1 if K<L).

Multiplexing gains are possible in calibration (i.e., K>1) provided M≥L>1, and this is possible even with $M_j = 1$ for all j>1. In fact, $M_j$ plays no role in the multiplexing gains provided by the "single channel use" pilot transmissions in this section. The larger arrays, i.e., $M_j > 1$ can be used to provide noise immunity in the calibration technique, by exploiting a transmit beam-forming effect in the pilot transmission.

Simultaneous Calibration in the Context of Larger-Scale Calibration Problems

The calibration schemes in the preceding subsection can be readily used in the context of larger-scale calibration problems, including hierarchical calibration. For instance, there are scenarios in which at a given time there are multiple "zero-th" arrays, that is, a set of conditions of the form given in Eqns. (3)-(4) may hold between a precalibrated (zero-th) array and a subset of arrays (or nodes) with indices in the set $\{j\}_{j>0}$. In such cases, simultaneous transmissions of pilots yield at each "zero-th" array observations of the form given in Eqn. (5) which can be used to individually calibrate each array individually with the set of transmitting nodes. However, these measurements may also be jointly used systematically to solve a larger-calibration problem.

To illustrate this, consider re-expressing from the form in Eqn. (6) to the form in Eqn. (8) as $$\ell_j = \frac{\tilde{Y}_{oj}}{\tilde{Y}_{j0}}$$

where $$\tilde{Y}_{0j} = f_j^H Y_j^T A_j^{-1} v_j \text{ and } \tilde{Y}_{j0} = f_j^H P^T A_0^{-1} y_0,$$

with $f_j^H$ denoting the j-th row of F in Eqn. (15). Using also Eqns. (12) and (13), the following equation $$\begin{bmatrix} \tilde{Y}_{j0} \\ \tilde{Y}_{0j} \end{bmatrix} = \begin{bmatrix} c_0 \\ c_j \end{bmatrix} \tilde{\rho}_{0,j} + \begin{bmatrix} \tilde{Z}_{j0} \\ \tilde{Z}_{0j} \end{bmatrix}, \quad (16)$$

where $$\tilde{\rho}_{0,j} = f_j^H q_j, \tilde{Z}_{0j} = f_j^H Z_j^T A_j^{-1} v_j \text{ and}$$

$$\tilde{Z}_{j0} = f_j^H P^T A_0^{-1} z_0 + c_0 \sum_{k \neq j} f_j^H q_k$$

Comparison of Eqns. (1) and (q6) reveals that, provided $f_j$ is chosen according to Eqn. (15) and provided the observations sets $Y_j$ are of sufficiently high quality, observation pairs of the form of Eqn. (16) can be used to form LS cost functions for relative calibration, in the same way observation pairs of the form in Eqn. (1) can be used to form LS cost functions of the form in Eqn. (2).

As a simple example consider the case involving D>1 precalibrated M-dimensional arrays indexed as (0, i) for i=1, 2, . . . , D. Assume K nodes, indexed with j≥1, have pilot observations from each of these D arrays with pilot dimension L≤M. A single simultaneous pilot transmission from nodes with indices $\{j\}_{j=1}^K$ with K≤L, suffices to calibrate the array comprising the DM-dimensional arrays and the K transmitting nodes. In particular, the observations at antenna array (0,i) can be combined with those at the K nodes to obtain K pairs of effective observations of the form in Eqn. (16), each pair corresponding to a distinct pilot-transmitting node j and array (0,i). Letting $(\tilde{Y}_{ji}, \tilde{Y}_{ij})$ denote the pair of such observations associated with node j and array (0,i), the set of observation pairs $$\{(\tilde{Y}_{ji}, \tilde{Y}_{ij}) 1 \leq j \leq K, 1 \leq i \leq D\}$$

can be then used to set up a LS cost function of the form in Eqn. (2).

To get a sense of the power of the random variables in Eqn. (16), consider the special case where M=L, P=I, $A_j A_j^H = I$, $|c_j/c_0| = 1$, $\sigma_z^2(j) = \sigma_z^2$, and $v_j$ is a vector with one non-zero-element with value 1. Then $$E[|\tilde{Z}_{0j}|^2] = \sigma_z^2, \text{ and } E[|Z_{j0}|^2] = K\sigma_z^2. \quad (17)$$

Due to Eqn. (15), we have $f_j^H \tilde{q}_k$, for k≠j, which, together with Eqn. (13), yields $$c_0 f_j^H q_k = -\frac{c_0}{c_k} f_j^H Z_k^T A_k^{T-1} v_k$$

and which has power $\sigma_z^2$. Noting also that $c_0 f_j^H q_k$ and $c_0 f_j^H q_m$ are independent for m≠k yields $E[|\tilde{Z}_{j0}|^2]$ in Eqn. (17). Furthermore, assuming $\sigma_b^2(j) = \sigma_b^2$, and $T_j T_d^H = I$, then for sufficiently large $SNR \sigma_b^2/\sigma_z^2$, $$E[|\tilde{\rho}_{0,j}|^2] \approx (L-K+1)\sigma_b^2. \quad (18)$$

From Eqns. (17) and (18), one can observe that the SINR (signal to interference plus noise ratio) in the calibration observation pairs of the form Eqn. (16) scales as (L−K+1)/K, i.e., as expected, the higher the multiplexing gain K, the lower the effective SINR.

Single-Tone Calibration: Signaling and Calibration Over T Channel Uses

Using the findings of the preceding section, calibration schemes are set forth for this, including pilot-signaling and calibration algorithms, which allow calibrating an array whose size grows quadratically with T. Consider such a protocol that focuses on maximizing the size of the calibrated array, subject to a fixed set of calibration-pilot channel uses, T. The protocol starts by calibrating a two-element array via two channel uses (each channel used by one of the elements to broadcast a pilot), and then iteratively increases the size of the calibrated array, by relying on multi-element pilot transmissions and iterative calibration with respect to the already calibrated part of the array.

Without loss of generality, one can "align" the iterative calibration process with the pilot-broadcasting time index, t. According to the protocol, in the first two time slots, two distinct antennas, e.g., 1 and 2, broadcast calibration pilots, one at a time. Observation of each other's pilots allows calibration on the 2-dimensional array comprising of elements 1 and 2. Note that every other antenna element has available observations based on the pilots broadcasted in slots 1 and 2. As a result, in slot 3 two more antenna elements can be calibrated by simultaneously transmitting pilots, thereby resulting in 4-dimensional calibrated array based on the pilot broadcasts at times 1, 2, and 3. This is because the scenario described by Eqns. (3)(5) exists with $M=2$, $M_j=1$ for all $j \geq 1$, $L=2$, and $P=I$, thus, calibration of another $K \leq L=2$ antennas with respect to the two-dimensional array $\{1, 2\}$ is possible with a single pilot transmission. This results in a calibrating a 4-element array with three pilot transmissions.

Figure 2:
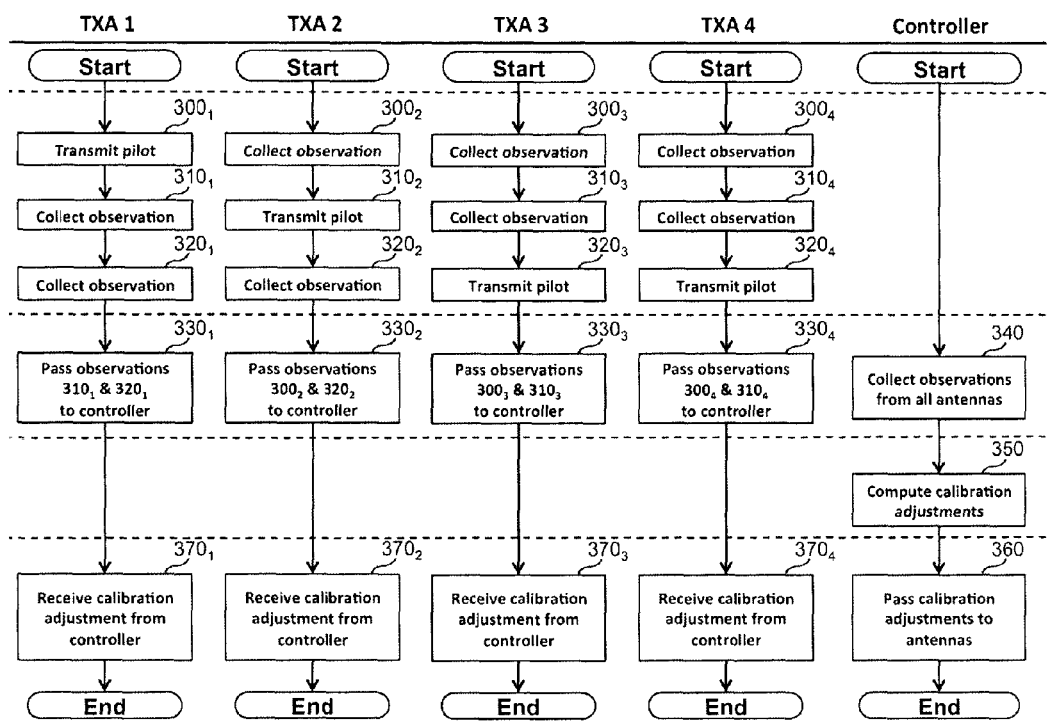
FIG. 2 is a flow diagram illustrating one embodiment of a calibration process for calibration of a 4-element array with 3 channel transmissions.

A flow chart for an embodiment that allows such calibration of a 4-element array is shown in FIG. 2. Referring to FIG. 2, at first, transmit-antenna (TXA) 1 transmits a pilot ($300_1$), while TXAs 2, 3, 4, collect observations in response to this pilot ($300_2$, $300_3$, and $300_4$, respectively). Then, TX2 transmits a pilot ($310_2$), while TXAs 1, 3, 4, collect observations in response to this pilot ($310_1$, $310_3$, and $310_4$, respectively). Finally, TXA 3 and TXA 4 simultaneously transmit a pilot ($320_3$ and $320_4$, respectively), while TXAs 1 and 2 collect observations in response to this simultaneous pilot transmission ($320_1$, and $320^2$, respectively). Next, all the transmit antennas provide their observations ($330_k$ for $k=1, 2, 3, 4$) to the controller. The controller collects all the observations (340). Then the controller performs relative calibration to compute calibration adjustments for all the antennas (350). In particular, using the available observations $300_2$ and $310_1$, the controller calibrates TXA 1 and 2 into a two-dimensional array by use of the method in, for example, Bursalioglu, or Argos, which is well-known in the art. Then, the controller uses the remaining observations to calibrate TXAs 3 and 4 with respect to the $\{1, 2\}$ array with the methods disclosed herein (e.g., by computing $l_j$ for each in equation (14), where j is the index of the antenna that is calibrated). Then, the controller passes the calibration adjustments (360) to all the TXAs. Each TXA receives its own adjustment ($370_k$ for $k=1, 2, 3, 4$) and performs the required calibration.

Note that the order of operations 300, 310, 320 is not necessary. That is, operation 320 can come before 310 and/or 300, and 310 can come before 300. The important element is that all these transmissions happen in independent resources over which all point-to-point channels between antennas TX1 to TX4 are effectively constant. Note also that calibration of the two dimensional array comprising TX1 and TX2 can be accomplished at any time after operations 300 and 310 have taken place (e.g., before, at the same time, or, after operation 320), while the whole array can be calibrated only after all of the operations in the set $\{300, 310$ and $320\}$ have taken place.

In one embodiment, the process is extended to calibrate arrays that have more than 4 elements. For example, if an extension of the previous protocol in which more antennas collect observations during the first 3 pilot transmissions is considered. Thus, in time slot 4, there is a problem of calibration with respect to a pre-calibrated 4-dimensional array $\{1, 2, 3, 4\}$. Given that 3 pilots from 3 linearly independent beams have been observed by each of the remaining (uncalibrated) elements, the situation described by equations (3)-(5) with M=4, and $$P = \begin{bmatrix} 1 & 0 & 0 & 0 \\ 0 & 1 & 0 & 0 \\ 0 & 0 & 1 & 1 \end{bmatrix}^T \quad (19)$$

and L=3.

Therefore, K=L=3 more antennas can be calibrated with a single pilot transmission (in slot 4), overall yielding a 7-element calibrated array with 4 channels used for calibration pilots. In the general case, prior to the k-th slot transmission, observations from k−1 pilots on k−1 linearly independent beams from the already calibrated elements are available to each uncalibrated element. It follows that (at most) k−1 more of these elements can be calibrated with respect to the already calibrated array. As a result at time T, the size of the calibrated array with this scheme is given by $$M_{array}(T)=1+\Sigma_{k=2}^{T}(k-1)=T(T-1)/2+1 \quad (20)$$

The above protocol can be conveniently expressed via a T-column pilot matrix P(T), defined such that (i,t)th element of P(T) denotes the pilot scaling factor of the pilot broadcasted by antenna i at time t (and where a zero value implies that the antenna i is not broadcasting a pilot at time t). The matrix P(t) for this protocol can be described recursively: we have P(1)=1, while at any time t>1, the pilot matrix P(t) satisfies $$P(t) = \begin{bmatrix} P(t-1) & 0 \\ 0 & 1_{(t-1) \times 1} \end{bmatrix}$$

The calibration efficiency of this protocol at each t in $\{1, 2, \ldots, T\}$ is illustrated in Table 1.

TABLE 1

Single-tone calibration protocol, calibrating arrays over T slots.
Calibration Pilot Efficiency
Number of Antennas Transmitting Calibration Pilots
as a function of time slot index t

| Index t: | t = 1 | t = 2 | t = 3 | t = 4 | ... t | ... t = T |
|---|---|---|---|---|---|---|
| # of TXAs: | 1 | 1 | 2 | 3 | ... t − 1 | T − 1 |

Signaling and Calibration Over N Tones by T Time-Slot Channel Uses

Embodiments of the present invention include signaling and calibration protocols over a T×N block of time-frequency slots. Assume that T and N are within the channel coherence time and bandwidth, respectively, and that all (unknown) TX/RX RF chain impairment coefficients are constant over the T×N block of time-frequency slots. The focus is on the case where each antenna broadcasts a single pilot, over a single TF slot. Each AP antenna can "listen" to all TF slots except the N TF slots that have the same time index as the TF also used by the antenna for its pilot broadcast.

Given these constraints, iterative calibration schemes can be constructed to iteratively increase the size of the calibrated array. These schemes exploit a mapping of TF slots indices. Much like in the previous section, $K_m$ pilots are transmitted at index m, with the goal to allow calibration of $K_m$ elements to the already calibrated set of antenna elements. Taking into account the fact that no antenna can "listen in" on other-tone pilot transmissions at the time the antenna broadcasts its own pilot, the mapping that allows maximizing the size of the calibrated array (after T channel uses) is given by:

$$m(t,n)=(n-1)T+t,$$

while the corresponding (largest possible) $K_m$ values are shown in Table 2:

TABLE 2

Calibration-Pilot Efficiency

| OFDM tone | Number of Antennas Transmitting Pilots in (t, k) slot | | | | |
|---|---|---|---|---|---|
| | t = 1 | t = 2 | t = 3 | t = 4 | ... t = T |
| k = 1 | 1 | 1 | 2 | 3 | ... (T − 1) |
| k = 2 | T − 1 | T | T + 1 | T + 2 | ... 2(T − 1) |
| k = 3 | 2(T − 1) | 2T − 1 | 2T | T + 1 | ... 3(T − 1) |
| . | . | . | . | . | . |
| . | . | . | . | . | . |
| . | . | . | . | . | . |
| k = N | (N − 1)(T − 1) | (N − 1)(T − 1) + 1 | (N − 1)(T − 1) | (N − 1)(T − 1) + 3 | ... N(T − 1) |

This protocol can calculate an array of size.

$$M_{max}(T,N)=\Sigma_{k=1}^{(N-1)T}k+(T-1)\Sigma_{k=1}^{(n-1)}K+1=\tfrac{1}{2}N^2T(T-1)+1, \quad (35)$$

which is quadratic in both N and T.

Protocols can also be designed that perform calibration sequentially over time (i.e., based on N time-frequency slots at a time) and can also calibrate arrays whose size grows quadratically with N and T. In this case, the mapping of time-frequency slots to iteration rounds of calibration is given by $$m(t,n)=t.$$

The $K_m$'s (or Kt's in this case) for one such protocol are illustrated in Table 3. For this case, in each of the first N time-frequency slots in each of the two first time indices, N distinct antennas transmit calibration pilots. After two time slots, a network of 2N elements can thus be calibrated with relative calibration techniques described above. In one embodiment, the 2N antennas transmitted isolated pilots in the first two N-dimensional OFDM symbols. Each antenna transmits a pilot in a single given (time-freq) resource element and receives all pilots from the N resource element corresponding to the (time-frequency) resource elements with a different time index from the one the antenna transmitted. A calibration method that is used in one embodiment is that disclosed in Bursalioglu. In addition, after two time slots, each of all the remaining, uncalibrated, elements has available 2N observations on L=2N (linearly independent) pilot beams from the calibrated 2N-dimensional ("reference") array. As a result, at time t=3, on each tone K=L=2N elements can be calibrated (simultaneously transmitting pilots in a single TF slot and using the techniques disclosed herein (e.g., eqn. (14)), yielding a calibrated array of size $2N+2N^2$. At time t=4, each uncalibrated element has available observations from 3N (linearly independent) pilots on the $2N+2N^2$ pre-calibrated array. Given that 3N pilots from L=3N linearly independent beams have been observed by each of the remaining elements, the situation is as described by equations (3)-(5) with $M=2N+2N^2$, Mj=1 for j>1, and L=3N. As a result, K=L=3N elements can be calibrated (simultaneously transmitting pilots) on each tone at time t=4, yielding a calibrated array of total size $2N+2N^2+3N^2$ elements. Similarly at time t=k≥3, each uncalibrated element has available observations from L=(k−1)N (linearly independent) pilots on the pre-calibrated array with M≥L. As a result, K=L=(k−1)N more elements can be calibrated (simultaneously transmitting pilots) on each tone at time t=k. In total, during a T×N block of time-frequency slots with T>1, the size of the maximum-size calibrated array with this scheme is given by $$M_{array}(T,N)=2N+N^2\Sigma_{k=3}^{T}(k-1)=2N+N^2[T(T-1)/2-1] \quad (21)$$

The calibration efficiency of this protocol at each time-frequency slot is illustrated in Table 3.

TABLE 3

Protocol calibrating array over N and T time slots
Calibration Pilot Efficiency

| OFDM tone | Number of antennas transmitting pilots in (t, k) slot | | | | |
|---|---|---|---|---|---|
| | t = 1 | t = 2 | t = 3 | t = 4 | ... t = T |
| K = 1 | 1 | 1 | 2N | 3N | ... (T − 1)N |
| K = 2 | 1 | 1 | 2N | 3N | . (T − 1)N |
| . | | | | | . |
| . | . | . | . | . | . |
| . | | | | | . |
| K = N | 1 | 1 | 2N | 3N | ... (T − 1)N |

Drawing on the multiplexing-gains vs. receive beamforming gains trade-offs described earlier, there are a family of calibration signaling and estimation schemes which trade-off multiplexing gains with calibration diversity. In particular, at any time t≥3, $K_t$ distinct uncalibrated antennas simultaneously transmit in each time-frequency slot, with $1 \le K_t \le (t-1)N$. The multiplexing gain diversity tradeoffs of these schemes are depicted in Table 4. One interesting special case involves providing at each time slot diversity order N. In that case, at each TF frequency slot at time t, $K_t$ transmit antennas (TXAs) simultaneously transmit pilots, with $K_t$ given by $$K_t=(t-2)N+1, \text{ for } t>1.$$

As a result, the size of the resulting calibrated array with this scheme is given by $$M_{array}(T,N;Rx \text{ diversity order}=N)=NT+N^2(T-1)(T-2)/2 \quad (22)$$

which is still quadratic in N and T.

TABLE 4

Multiplexing gain vs. diversity trade-offs as a function of the
number of TXAs simultaneously transmitting pilots at time t

| Time index t: | t = 1 | t = 2 | t = 3 | t = 4 | ... t = T |
|---|---|---|---|---|---|
| Pilot TXing TXAs per TF slot | $K_1 = 1$ | $K_2 = 1$ | $K_3$ $1 \le K_3 \le 2N$ | $K_4$ $1 \le K_4 \le 3N$ | $K_T$ $1 \le K_T \le (T-1)N$ |
| Pilot TXing TXAs per time slot | N | N | $NK_3$ | $NK_4$ | $NK_T$ |
| Pilot dimensions up to time t | N | 2N | 3N | 4N | TN |
| Calibrated TXAs per TF slot | 0 | 2 | $K_3$ | $K_4$ | $K_T$ |
| Calibrated TXAs per time slot | 0 | 2N | $NK_3$ | $NK_4$ | $NK_T$ |
| Calibrated TXAs up to time t | 0 | 2N | $2N + NR_3$ | $N(K_3 + K_4 + 2)$ | $2N = N \Sigma_{k-3}^T K_k NK_T$ |
| Diversity (RX BF dimensions) | — | N | $2N - K_3 + 1$ | $3N - K_4 + 1$ | $(T-1)N - K_T + 1$ |

Another case of interest involves the case where the $K_t$'s are chosen subject to a the effective SINR in the effective measurement pairs of the form in Eqn. (16) exceeding a threshold. Inspection of Eqns. (17) and (18) reveals that, when there are there are L pilot dimensions from the calibrated part of the array to each uncalibrated antenna and if K≤L uncalibrated antennas transmit simultaneously pilots in a TF slot, the effective SINR is proportional to (L−K+1)/K. Hence, we may consider signaling protocols whereby the multiplexing gain $K_t$ at time t is chosen such that $$\frac{N(t-1) - K_t + 1}{K_t} \ge a$$

for some predetermined α>0, or equivalently, choosing the largest $K_t$ satisfying these constraints, $$K_t = \left\lfloor \frac{t-1}{a+1} N + \frac{1}{a+1} \right\rfloor$$

With such choices, the size of the calibrated array grows as $(2+2\alpha)-1 N^2 T^2$, i.e., still quadratic in N and T. In the case α=1, with N even, we obtain $K_t=(t-1)N/2$ for t>2, i.e., half of the multiplexing gains provided in the maximum multiplexing-gains schemes of Table 4.

To illustrate the improved efficacy of the calibration schemes presented in this section, consider for example calibration over a block of N=12 tones and T=7 OFDM symbols, corresponding to half the size of a resource-block (RB) in LTE. The baseline scheme would calibrate in this case an array of size TN=84 elements. The maximum-size array that can be calibrated with the protocols in this session is given by Eqn. (21) and equals 2,904 elements. Alternatively, from Eqn. (22), an array of size 2,244 elements can be calibrated over this 7×12 block of time-frequency slots, with RX beamforming diversity of order N=12 at each stage of the sequential calibration. Finally, the SINR-guaranteeing scheme with α=1 allows calibration of an array of size 1,464 elements, still a significant improvement over the baseline scheme.

Calibration Over N by T Slots with Coherence Bandwidth F Less than N

In one embodiment, the relative calibration coefficients are constant over the N tones while the "effective" coherence bandwidth of the propagation channel is F. As in previous embodiments, the number of consecutive OFDM tones, T, is assumed to be within the coherence time of the channel. In one embodiment, bidirectional measurements may be used for calibration as long as the two channel soundings (are at different OFDM symbols and) are not separated by more than F tones. It can be readily shown that the size of the maximum-size calibrated array grows as $NFT^2$, while the size of the calibrated arrays based on an SINR-guaranteeing scheme, grows as $(1+\alpha)^{-1} NFT^2$. Finally, note that in calibrating networks of dispersed antenna elements, such calibration protocols can be simultaneously reused to calibrate in parallel parts of the wireless network. In this case, hierarchical calibration can be exploited to jointly calibrate precalibrated arrays and uncalibrated elements. In this case, calibration may amount to first obtaining effective-observation pairs of the form in Eqn. (16), followed by forming an appropriate LS cost function of the form Eqn. (2), with the pairs of the form in Eqn. (1) replaced by pairs of the form in Eqn. (16), and solving for the relative calibration coefficients as described earlier.

Example Flow Diagrams of Embodiments of the Calibration Processes

Figure 3:
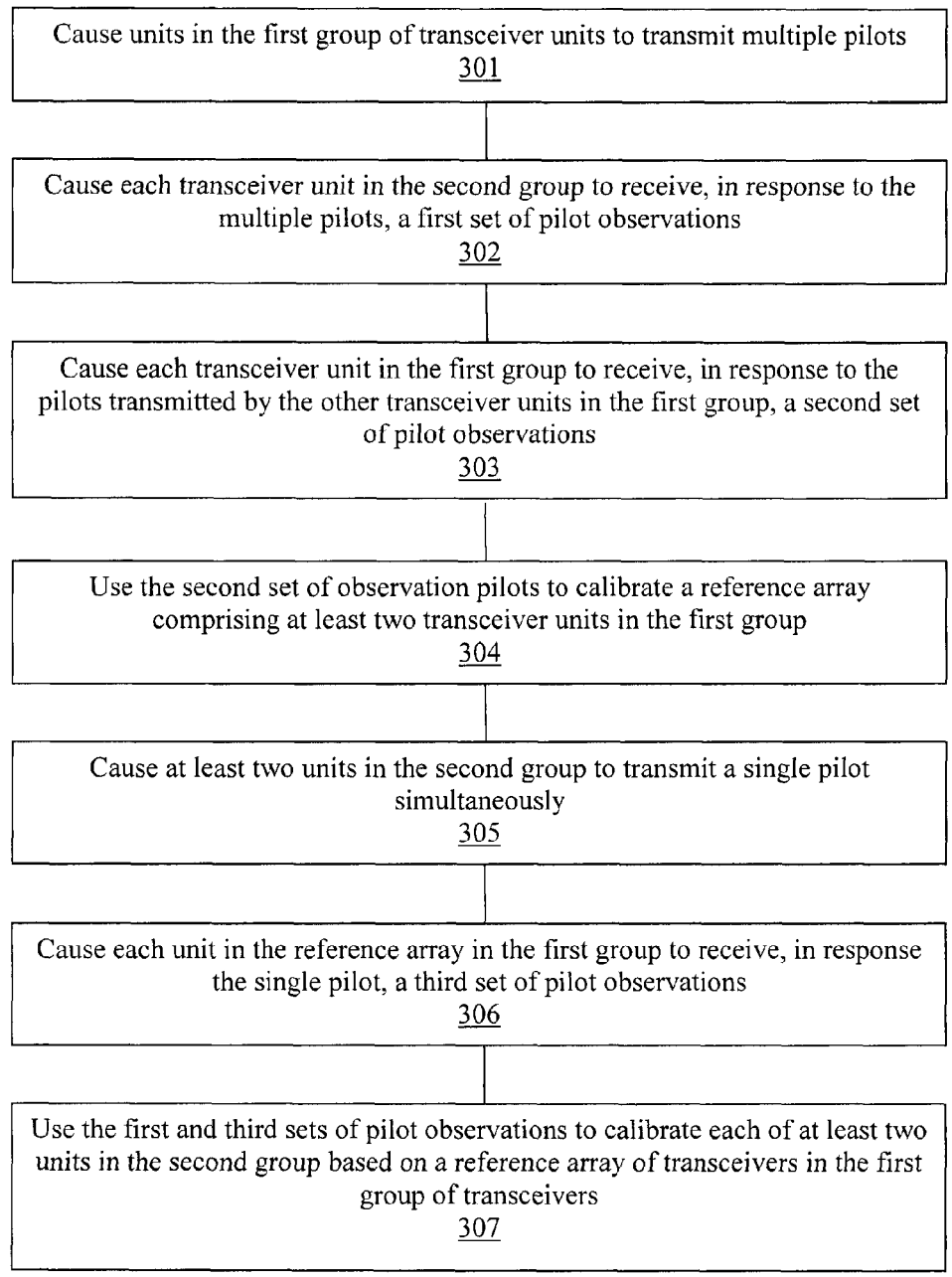
FIG. 3 is a flow diagram of one embodiment of a process for performing relative calibration of transceiver units in a first entity.

FIG. 3 is a flow diagram of one embodiment of a process for performing relative calibration of transceiver units in a first entity. The process is performed by processing logic that may comprise hardware (circuitry, dedicated logic, etc.), software (such as is run on a general purpose computer system or a dedicated machine), or a combination of both.

In one embodiment, the process is performed by a controller in a wireless communication system that includes one or more base stations or access points. The base stations and access points include transceiver units. In one embodiment, the transceiver units include first and second groups of transceivers units, where each transceiver unit includes an antenna element, for their use for joint transmission from the first and second groups of transceiver units in the first entity to at least one other wireless entity. In one such embodiment, the joint transmission enabled via channel-reciprocity based training. In one embodiment, the first entity is a base station.

Referring to FIG. 3, the process begins by processing logic causing units in the first group of transceiver units to transmit multiple pilots (processing block 301) and cause each transceiver unit in the second group to receive, in response to the multiple pilots, a first set of pilot observations (processing block 302). Note that in one embodiment the processing logic is part of a controller and causing units to perform a function comprises controlling them. Such control may include the use of, for example, instructions and/or signaling.

Processing logic also causes each transceiver unit in the first group of transceivers to receive a second set of pilot observations in response to pilots transmitted by other transceivers in the first group (processing block 303).

Thereafter, processing logic calibrates a reference array by calibrating relatively L antenna elements of transceivers in the first group with respect to a reference unit based on at least L pilot observations of the first set of pilot observations, where the L pilot observations are observations collected by elements in the reference array from pilots transmitted by elements in the reference array and L is equal to the number of transceivers in the reference array (processing block 304). The reference array becomes a "reference" array once its elements are relatively calibrated with one another (i.e., once all calibration coefficients that are a scaling with respect to a reference antenna in the reference array are described). This is done using the observations in the first group based on the pilots in the first group. Thus, in this manner, in one embodiment, the transceiver units in the first group have been jointly relatively calibrated with respect to the reference unit in the first group of unit prior to the multiple pilots being transmitted.

Furthermore, processing logic causes at least two units in the second group to transmit a single pilot simultaneously (processing block 305) and causes each unit in the first group to receive, in response the single pilot, a third set of pilot observations (processing block 306).

Then, processing logic uses the first and second sets of pilot observations to calibrate each of at least two units in the second group based on a reference array of transceivers in the first group of transceivers (processing block 307). This again is done by relative calibration where complex-scaling factors are estimated for all elements with respect to a single element (which ever element it is). The reference array means all these elements in the array have been relatively calibrated with one another, i.e. each can be expressed in terms of a reference element in the array. For example, the reference array used is given in eqn 3, with j=0. The reference-array (i.e., array 0) is calibrated with calibration described by the condition of eqn. 3, where each unit in the 0-th array gets a calibration scaling factor with respect to $c_0$. Note that the other arrays described (j>1) are also pre-calibrated locally (i.e., calibration at array j means all the elements of the j-th array are scaled with respect by a multiple of $c_j$ for some $c_j$). To calibrate array's j and 0 together we need to figure out the ratio $c_j/c_0$. Then we can describe the whole array comprising sub-array 0 and sub-array j in terms of a single element (e.g., 0). Thus, the method allows obtaining as many as L such ratios of $c_j/c_0$ with a single additional pilot transmission, provided the other arrays have observed at L linearly independent pilots from the "zeroth" array, and the zeroth array is at least L elements long (and precalibrated).

In one embodiment, using the first and second sets of pilot observations to calibrate each of at least two units in the second group comprises producing for each of the at least two units in the second group an estimate of the relative calibration coefficient between a transceiver unit of the at least two units in the second group and a transceiver of a reference unit in the reference array. In one embodiment, the relative calibration coefficient of one transceiver unit of the at least two units in the second group comprises a ratio of one calibration coefficient of the one transceiver unit over a ratio of one calibration coefficient of the reference unit, and further wherein the calibration coefficient of the one transceiver unit is defined as a ratio of transmitter gain of the one transceiver unit over receiver gain of the one transceiver unit.

In one embodiment, using the first and second sets of pilot observations to calibrate each of at least two units in the second group comprises generating calibration adjustments based on observations in the first and second sets of pilot observations and sending the calibration adjustments to the K transceiver units. In one embodiment, each calibration adjustments comprises an estimate of the relative calibration coefficient between a transceiver unit of the second group and a transceiver of the reference array at the first entity.

It should be noted that instead of the reference array the calibration could be performed by the processing logic (e.g., controller) using as a reference a smaller part which comprises of the array elements that transmitted pilots in a subset of the previous t slots (t being an integer), such that this subset of slots, and the corresponding subset of antennas transmitting pilots in these slots, are each in size at least as large as the set of additional antennas to be calibrated. However, it is advantageous to use as a reference array the whole calibrated array of size equal to the entire portion of the array that has already been calibrated, corresponding to using observations from all the pilots from all t previous slots, since that provides beamforming gains with a larger reference array size and all the observations are used.

FIG. 4 is a flow diagram of one embodiment of a process for performing relative calibration of transceiver units in a first entity. The process is performed by processing logic that may comprise hardware (circuitry, dedicated logic, etc.), software (such as is run on a general purpose computer system or a dedicated machine), or a combination of both.

In one embodiment, the process is performed by a controller in a wireless communication system that includes one or more base stations or access points. The base stations and access points include transceiver units. In one embodiment, the transceiver units include first and second groups of transceivers units, where each transceiver unit includes an antenna element, for their use for joint transmission from the first and second groups of transceiver units in the first entity to at least one other wireless entity. In one such embodiment, the joint transmission enabled via channel-reciprocity based training.

Referring to FIG. 4, the process begins during a first stage with processing logic causing the broadcasting of a first set of pilots from the first group of transceiver units one at a time over L slots, where the first group of transceiver units containing L transceiver units, where L is an integer 2 or greater (processing block 401). In response to the first set of pilots, processing logic causes a first set of pilot observations at the first and second groups of transceiver units to be received, where each transceiver unit in the second group of transceiver units collects L observations in response to the first of pilots (processing block 402). Thereafter, processing logic calibrates an L element reference array comprising the L transceiver units of the first group of transceiver units, by relatively calibrating the L elements relatively with respect to each other based on at least L pilot observations of the first set of pilot observations, with the L pilot observations being observations collected by elements in the L element reference array from pilots transmitted by elements in the L element reference array (processing block 403). In one embodiment, this ends the first stage.

Next, during a second stage, processing logic causes the broadcasting simultaneously of a second set of pilots from K transceiver units of the second group of transceiver units, wherein each of the K transceiver units broadcast a single pilot per slot over one or more slots (processing block 404) and the receiving of a second set of pilot observations at the first group of transceivers in response to the second set of pilots (processing block 405).

Based on the first and second sets of pilot observations, processing logic calibrates K transceiver units with respect to the L element reference array (processing block 406). In one embodiment, this ends the second stage. In one embodiment, calibrating K transceiver units comprises generating calibration adjustments based on observations in the first and second sets of pilot observations, and sending the calibration adjustments to the K transceiver units. In one embodiment, each calibration adjustments comprises an estimate of the relative calibration coefficient between a transceiver unit of the second group and a transceiver of the reference array at the first entity.

In one embodiment, the number of slots is equal to a total number of time slots for calibration pilots less L slots.

Signaling Embodiments Involving Large Networks of Non-Collocated Antennas

Embodiments for fast calibration are presented that allow fast and reliable calibration of dense Massive-MIMO deployments. In such embodiments, it is necessary to assign pilots in a coordinated fashion to enable fast and efficient calibration. One class of embodiments focus on calibrating antennas driven by the same local oscillator. The same embodiments can also be applied to systems where different antennas, or, groups of antennas, are driven by different local oscillators. In the latter case, (timing/frequency/carrier) synchronization is required and this is a problem in its own right. The techniques described can be applied to both cases. In the latter case, the calibration techniques have to be used (to perform calibration) at the (faster) synchronization rate. In one embodiment, calibration is performed (or adjusted) periodically at the same rate as synchronization, and right after synchronization has been established. This decoupling of synchronization and calibration provides more flexibility and allows tailoring the calibration waveforms and signaling to accommodate efficient calibration.

In one embodiment, antennas are driven by distinct oscillators. In such a case, based on synchronization signaling, sufficiently accurate (timing/frequency/carrier) synchronization has been performed so that the transmitting entities can be assumed to be effectively synchronized. In one embodiment, calibration is performed over OFDM transmissions carrying calibration pilots.

In one embodiment, the calibration bandwidth may be larger than a single tone. Indeed, the unknown (complex-phasor) amplitude is effectively constant over the transmission band, while the (complex-phasor) phase varies effectively linearly over the band. In these cases, one or a few complex scalars corresponding to the relative calibration between any antenna pair may suffice on a given tone suffice to determine the rest of the coefficients. Hence a single or, maybe, few calibration parameters may be needed per antenna to calibrate an antenna array for coherent transmission over the whole OFDM band. This can be exploited for efficient and fast calibration. First, it allows the use of training methods such as those described in the earlier sections whereby many closely located antennas can be calibrated together over successive OFDM tones (see, e.g., Table 3 and Table 4 which also include two OFDM symbols at the beginning where no multiplexing gains are enabled).

In a large-scale network of wireless transmission nodes (such as e.g., a cellular network of small cells), the time-frequency (TF) slot resources that are to be used for calibration have to be reused geographically. Given that reuse results in interference and thereby calibration quality deterioration, it is important to balance the costs of reuse (larger-distance geographic reuse requires more pilot resources and thus incurs higher overheads) and its effects on calibration performance (more aggressive shorter-distance geographic reuse, increases calibration-pilot interference, lowers the calibration SINR, and thereby negatively impacts calibration performance).

To illustrate the principles of viable calibration signaling approaches, consider antennas on a regular (e.g., square or hexagonal) grid, whereby at each grid location there is a large (potentially massive) number of antennas. In one embodiment, the calibration of antennas in this network may have its goal to enable cellular transmission (coherent transmission over antennas at each location), as well as Network MIMO type transmission (whereby coherent transmission over antennas at multiple nearby locations is required). In one embodiment, calibration in all these cases is based on signaling over several OFDM symbol transmissions.

First consider embodiments for enabling network MIMO type transmission. These require calibration of the field of antennas dispersed across large areas of the network. In one embodiment, at first $T_1$ (with $T_1 \geq 2$) OFDM symbols are used to transmit pilots (with frequency/spatial reuse) on a (possibly sparser) grid of antenna locations, which defines a "calibration-anchor graph." This allows for performing LS calibration on the calibration-anchor graph, based on the techniques in Bursalioglu. The nodes defining the anchor graph correspond to a small subset of antennas (possibly sparsely) spaced out on the anchor grid, with e.g., a single antenna per grid point in the grid being part of the anchor graph. Each anchor node uses at least one TF slot out of the first $T_1$ OFDM symbols. Each antenna (whether anchor or not) collects observations on all (or a subset) of the pilots transmitted by the anchor nodes. For each anchor antenna, collecting such observations is possible over all OFDM symbols except the one(s) that transmits pilots.

The fact that N calibration pilots, emanating from distinct (closely located) antenna elements, can be multiplexed together (over the N tones of a single OFDM symbol) implies that there are $N \times T_1$ available "colors" to color the calibration-anchor graph. Thus, each TF slot (color) used by an anchor node can be reused at a large-geographic distance. Therefore, this pilot can be received at sufficiently high signal-to-interference ratio at neighboring nodes in the graph. This allows obtaining bidirectional measurements amongst neighboring nodes (with sufficiently high SINR) and can be used to perform LS calibration on the calibration-anchor graph, based on the techniques in Bursalioglu.

In one embodiment, once the calibration-anchor graph has been relatively calibrated (i.e., all nodes in the graph have been calibrated with respect to a single node in the graph), more OFDM (calibration-pilot) symbols follow, that can exploit multiplexing gains in the calibration pilots via the calibration methods disclosed at earlier portions of the application. These involve sets of closely-located (uncalibrated) antennas simultaneously transmitting pilots, with goal to establish their relative calibration with respect to the already calibrated elements in anchor graph. In one embodiment, successively increasing multiplexing gains (per subsequent OFDM symbol) can be exploited via simultaneous signaling (over the same TF slot) of calibration pilots from closely located sets of antenna elements. This can enable rapid increase in the density of the calibrated array, i.e., in calibrated elements per unit area with the calibration protocols of the previous section. In one embodiment, one or a few additional OFDM symbol transmissions are used, which can enable hierarchical cluster calibration (e.g., to fill in any "gaps" between calibrated clusters) based on the techniques in Bursalioglu. This transmission can also exploit spatial and frequency reuse, possibly together with the transmit beamforming techniques in Bursalioglu.

As an example consider a square grid with a large number, M, of antennas per grid point. Assume the anchor graph is formed by choosing one antenna per grid point as a node in the anchor graph. Assuming N=64 TF slots are used for pilots, and assuming $T_1=2$ OFDM symbols are used for the signaling that enables calibration on the anchor graph, there are 128 "colors" available for the calibration graph. This allows a reuse of 128 on the "square-grid" defined by the anchor nodes. Letting $(n_1, n_2)$, with $n_1$, $n_2$ integers, denote the square grid locations, a TF slot used by a node at locations $(n_1, n_2)$, is reused by the anchors at $(\pm 8+n_1, \pm 8+n_2)$ grid locations. This in general allows nearby anchors (and non-anchors), e.g., at locations $(k_1+n_1, k_2+n_2)$, with $-1 \le k_1$, $k_2 \le 1$, to have sufficiently high SINR in their observations of pilots transmitted by the anchor at location $(n_1, n_2)$. As a result, once the observations of the first $T_1$ OFDM symbols are a collected, it is possible to perform least-squares (LS) calibration on the anchor graph (i.e., calibrate all the antenna elements in the anchor graph) with the techniques in Bursalioglu. Over the next two OFDM symbols, 9 non-anchors at node (n1, n2) can be simultaneously calibrated by simultaneously transmitting, using the "same color" (TF slot two OFDM symbols later) as the anchor at that location. Hence, after 4 OFDM symbols the calibrated array includes 10 nodes per grid location. Similarly, over the next two OFDM symbols 18 additional non-anchors per grid location can be simultaneously calibrated by simultaneously transmitting pilots on the same TF slots, yielding the desired total of 28 nodes per grid location. A total of 10 OFDM symbols can be used to calibrate a network with about 91 antennas per site with this protocol.

In another embodiment, at first calibration is accomplished sequentially locally with very aggressive spatial reuse (i.e., prior to performing any calibration on the anchor graph). To illustrate this consider using at each location 8 OFDM tones. This results in a spatial reuse factor of 8. Using the protocol in Table 4 in the order of 1000 antennas can be trained per location. The last two OFDM symbols can then be used to calibrate an anchor calibration graph. Clearly many variants of the two schemes can be established.

Alternatives of the above embodiments are also very attractive. In one embodiment, only the local calibration component is performed, that is the second step involving calibration of on the anchor graph is not implemented. Based on this type of calibration, in which all elements at each location are relatively calibrated with one another, cellular coherent transmission can be enabled. In one embodiment, a second step of hierarchical calibration is performed selectively (i.e., not necessarily over the whole network as was eluded by the calibration-anchor graph) in some areas, where network MIMO transmission would be beneficial. Such areas may correspond to "hot spots" in which the network MIMO benefits (with respect to cellular transmission) may be required to cope with the location-specific (and possibly time-specific) traffic demands.

Embodiments of the invention have one or more of the following advantages with respect to Argos and the techniques in Bursalioglu.

1. In the basic scenario considered by Argos, involving calibrating a large array of collocated elements, the calibration techniques set forward herein allow calibrating arrays of much larger size (possibly orders of magnitude larger) without increasing the training overhead; the new techniques can also provide calibration robustness with respect to the Argos technique, without the need for additional signaling.

2. In the basic scenario considered by Argos and Bursalioglu, involving a large array of collocated elements, larger array sizes than in Argos and Bursalioglu can be jointly calibrated subject to a given calibration-training overhead (in resources), while at the same time, providing calibration robustness with respect to the Argos technique, of the type provided by the techniques in Bursalioglu.

3. The methods presented herein can also be used to allow low-overhead calibration of remote-radio head (RRH) systems for MU-MIMO, and of cellular deployments for network MIMO transmission.

4. The methods in embodiments of this invention can also be used to enable more general MU-MIMO deployment schemes, whereby user terminals are simultaneously served by different (overlapping) sets of antennas in a field of antenna elements. Such calibration is not feasible by the Argos calibration methods. Embodiments of the present invention allow performing such calibration with (possibly much) lower overheads than the techniques in Bursalioglu.

5. Embodiments of the invention also include reference-signaling methods for sequential calibration of subsets of possibly non-collocated possibly overlapping sets of antennas elements so as to enable reciprocity-based MU-MIMO transmission from each such set of antenna elements in a resource-efficient manner.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method of relative calibration of a first group of at least two transceiver units in a first entity with respect to a second group of at least two transceiver units in the first entity, each unit including an antenna element, for their use for joint transmission from the groups of units in the first entity to at least one other wireless entity, the transmission enabled via channel-reciprocity based training, the method comprising:
   transmitting multiple pilots from units in the first group;
   receiving, in response to the multiple pilots, a first set of pilot observations at each unit in the second group;
   transmitting a single pilot simultaneously from at least two units in the second group;
   in response to the single pilot, receiving a second set of pilot observations at each unit in the first group; and
   using the first and second sets of pilot observations to calibrate each of at least two units in the second group based on a reference array of two or more transceivers in the first group of transceivers, said each of at least two units in the second group being calibrated with reference to the two or more transceivers in the reference array.

2. The method defined in claim 1, further comprising receiving, in response to the multiple pilots, the first set of pilot observations by at least one pilot-transmitting unit in the first group, and using these observations to calibrate the reference array of transceivers in the first group of transceivers.

3. The method defined in claim 1, wherein using the first and second sets of pilot observations to calibrate each of at least two units in the second group comprises producing for said each of at least two units in the second group an estimate of the relative calibration coefficient between a transceiver unit of said at least two units in the second group and a transceiver of a reference unit in the reference array.

4. The method defined in claim 3, wherein the relative calibration coefficient of one transceiver unit of said at least two units in the second group comprises a ratio of one calibration coefficient of the one transceiver unit over a ratio of one calibration coefficient of the reference unit, and further wherein the calibration coefficient of the one transceiver unit is defined as a ratio of transmitter gain of the one transceiver unit over receiver gain of the one transceiver unit.

5. The method defined in claim 1, wherein the transceiver units in the first group have been jointly relatively calibrated to form the reference unit in the first group of units based on the first set of multiple pilots being transmitted.

6. The method defined in claim 1, wherein using the first and second sets of pilot observations to calibrate each of at least two units in the second group comprises: generating calibration adjustments based on observations in the first and second sets of pilot observations; and sending the calibration adjustments to the K transceiver units.

7. The method defined in claim 6, wherein each calibration adjustment comprises an estimate of the relative calibration coefficient between a transceiver unit of the second group and a transceiver of the reference array at the first entity.

8. The method defined in claim 1, further comprising: calibrating the reference array by calibrating relatively L antenna elements of transceivers in the first group with respect to a reference unit based on at least L pilot observations of the first set of pilot observations, the L pilot observations being observations collected by elements in the reference array from pilots transmitted by elements in the reference array, where L is equal to the number of transceivers in the reference array.

9. The method defined in claim 1, wherein the first entity is a base station or access point.

10. A base station comprising:
a plurality of transceivers, each transceiver of the plurality of transceivers comprising an antenna element; and
a calibration processor coupled to the plurality of transceivers, the calibration processor operable to
cause transceiver units in the first group to transmit multiple pilots,
receive a first set of pilot observations from transceivers in the second group, the first set of pilot observations including observations being generated by each unit in the second group in response to the multiple pilots,
cause at least two transceiver units in the second group to transmit a single pilot simultaneously,
receive a second set of pilot observations from transceivers in the first group, the second set of pilot observations including observations being generated at each unit in the first group, and
use the first and second sets of pilot observations to calculate relative calibration values, where each relative calibration value is associated with a transceiver of each transceiver unit and is calculated relative and with reference to a transceiver of a reference unit at the base station.

11. The base station defined in claim 10, wherein each relative calibration value comprises producing an estimate of the relative calibration coefficient between a transceiver unit of said at least two units in the second group and a transceiver of a reference unit in the reference array.

12. The base station defined in claim 11, wherein the relative calibration coefficient of one transceiver unit of said at least two units in the second group comprises a ratio of one calibration coefficient of the one transceiver unit over a ratio of one calibration coefficient of the reference unit, and further wherein the calibration coefficient of the one transceiver unit is defined as a ratio of transmitter gain of the one transceiver unit over receiver gain of the one transceiver unit.

13. The base station defined in claim 10, wherein the transceiver units in the first group have been jointly relatively calibrated to form the reference unit in the first group of units based on the first set of multiple pilots being transmitted.

14. The base station defined in claim 10, wherein the calibration processor is operable to calibrate the reference array by calibrating relatively L antenna elements of transceivers in the first group with respect to the reference unit based on at least L pilot observations of the first set of pilot observations, the L pilot observations being observations collected by elements in the reference array from pilots transmitted by elements in the reference array, where L is equal to the number of transceivers in the reference array.

15. The base station defined in claim 10, wherein each of the transceivers comprise: a plurality of modulation units coupled to the plurality of antennas to perform modulation for signals being transmitted by the plurality of antennas; and a plurality of demodulation units coupled to the plurality of antennas to perform demodulation for signals being received by the plurality of antennas.

16. The base station defined in claim 15, further comprising: a transmit MIMO processor coupled to the plurality of modulation units to generate signals for transmission; a MIMO detector coupled to receive signals from the plurality of demodulation units; and a receive processor coupled to the MIMO detector to process signals from the MIMO detector.

17. An article of manufacture having one or more non-transitory computer readable media storing instructions thereon which, when executed by an entity, cause the entity to perform a method for calibrating transceiver units of the entity, each unit including an antenna element, the method comprising:
transmitting multiple pilots from units in the first group;
receiving, in response to the multiple pilots, a first set of pilot observations at each unit in the second group;
transmitting a single pilot simultaneously from at least two units in the second group;
in response the single pilot, receiving a second set of pilot observations at each unit in the first group; and
using the first and second sets of pilot observations to calibrate each of at least two units in the second group based on a reference array of two or more transceivers in the first group of transceivers, said each of at least two units in the second group being calibrated with respect to the two or more transceivers in the reference array.

18. The article of manufacture defined in claim 17, wherein using the first and second sets of pilot observations to calibrate each of at least two units in the second group comprises producing for said each of at least two units in the second group an estimate of the relative calibration coefficient between a transceiver unit of said at least two units in the second group and a transceiver of a reference unit in the reference array.

19. The article of manufacture defined in claim 18, wherein the relative calibration coefficient of one transceiver unit of said at least two units in the second group comprises a ratio of one calibration coefficient of the one transceiver unit over a ratio of one calibration coefficient of the reference unit, and further wherein the calibration coefficient of the one transceiver unit is defined as a ratio of transmitter gain of the one transceiver unit over receiver gain of the one transceiver unit.

20. The article of manufacture defined in claim 17, wherein the transceiver units in the first group have been jointly relatively calibrated with respect to the reference unit in the first group of unit prior to the multiple pilots being transmitted.

21. The article of manufacture defined in claim 17, wherein using the first and second sets of pilot observations to calibrate each of at least two units in the second group comprises: generating calibration adjustments based on observations in the first and second sets of pilot observations; and sending the calibration adjustments to the K transceiver units.

22. The article of manufacture defined in claim 21, wherein each calibration adjustments comprises an estimate of the relative calibration coefficient between a transceiver unit of the second group and a transceiver of the reference array at the first entity.

23. The article of manufacture defined in claim 17, wherein the method further comprises: calibrating the reference array by calibrating relatively L antenna elements of transceivers in the first group with respect to a reference unit based on at least L pilot observations of the first set of pilot observations, the L pilot observations being observations collected by elements in the reference array from pilots transmitted by elements in the reference array, where L is equal to the number of transceivers in the reference array.

24. A method of relative calibration of a first group of at least M transceiver units in a first entity with respect to a second group of at least K transceiver units in the first entity, with M being greater than K and K being greater than one, each transceiver unit including an antenna element, for their use for joint transmission from the groups of transceiver units in the first entity to at least one other wireless entity, the transmission enabled via channel-reciprocity based training, the method comprising:
transmitting at least K pilots from transceiver units in the first group;
receiving, in response the at least K pilots, observations at each of the K units in the second group;
transmitting a single pilot simultaneously from the K elements in the second group;
receiving, in response the single pilot transmitted simultaneously from the K elements, a second set of observations at each unit in the first group; and
using the first and second set of pilot observations to produce for each transceiver unit in the second group an estimate of a relative calibration coefficient between the transceiver unit in the second group and a transceiver of a reference unit in the first group at the first entity, the transceiver of the reference unit acting as a reference by which the transceiver unit in the second group is calibrated.

25. The method defined in claim 24, wherein the relative calibration coefficient of one unit comprises a ratio of one calibration coefficient of the transceiver unit over a ratio of one calibration coefficient of the reference unit, and further wherein the calibration coefficient of the one transceiver unit is defined as a ratio of transmitter gain of the one transceiver unit over receiver gain of the one transceiver unit.

26. The method defined in claim 24, wherein at least K of the units in the first group have been jointly relatively calibrated with respect to the reference unit in the first group prior to the at least K pilots being transmitted, where the reference unit is in the set of K units.

27. A method for performing relative calibration of transceiver units in a first entity, the transceiver units including first and second groups of transceivers units, each transceiver unit including an antenna element, for their use for joint transmission from the first and second groups of transceiver units in the first entity to at least one other wireless entity, the joint transmission enabled via channel-reciprocity based training, the method comprising:
during a first stage,
broadcasting a first set of pilots from the first group of transceiver units one at a time over L slots, the first group of transceiver units containing L transceiver units, where L is an integer 2 or greater,
receiving a first set of pilot observations at the first and second groups of transceiver units in response to the first set of pilots, each transceiver unit in the second group of transceiver units collecting L observations in response to the first of pilots, and
calibrating an L element reference array comprising the L transceiver units of the first group of transceiver units, by relatively calibrating the L elements relatively with respect to each other based on at least L pilot observations of the first set of pilot observations, the L pilot observations being observations collected by elements in the L element reference array from pilots transmitted by elements in the L element reference array, where L is an integer greater than 1; and
during a second stage,
broadcasting simultaneously a second set of pilots from K transceiver units of the second group of transceiver units, wherein each of the K transceiver units broadcast a single pilot per slot over one or more slots, where K is an integer greater than 1,
receiving a second set of pilot observations at the first group of transceivers in response to the second set of pilots, and
calibrating K transceiver units with respect to the L transceiver units of the L element reference array based on observations in the first and second sets of pilot observations, the K transceiver units being calibrated with respect to the L transceiver units of the L element reference array.

28. The method defined in claim 27, wherein calibrating K transceiver units comprises: generating calibration adjustments based on observations in the first and second sets of pilot observations; and sending the calibration adjustments to the K transceiver units.

29. The method defined in claim 28, wherein each calibration adjustments comprises an estimate of the relative calibration coefficient between a transceiver unit of the second group and a transceiver of the reference array at the first entity.

30. The method defined in claim 27, wherein the number of slots is equal to a total number of time slots for calibration pilots less L slots.

* * * * *